US010239462B2

(12) United States Patent
Sorey et al.

(10) Patent No.: US 10,239,462 B2
(45) Date of Patent: Mar. 26, 2019

(54) CARGO CARRIER AND QUICK HITCH MOUNT

(71) Applicant: Multicraft Ventures, LLC, Pelahatchie, MS (US)

(72) Inventors: Anthony D. Sorey, Forest, MS (US); Christopher C. Schooler, Brandon, MS (US); Tommy E. Nichols, Jr., Brandon, MS (US); Charles D. Flumm, Brandon, MS (US); James L. O'Cain, Morton, MS (US); Paul H. Jones, Jr., Canton, MS (US)

(73) Assignee: Multicraft Ventures, LLC, Pelahatchie, MA (US)

( * ) Notice: Subject to any disclaimer, the term of this patent is extended or adjusted under 35 U.S.C. 154(b) by 287 days.

(21) Appl. No.: 15/217,685

(22) Filed: Jul. 22, 2016

(65) Prior Publication Data

US 2018/0022287 A1    Jan. 25, 2018

(51) Int. Cl.
*B60R 9/00* (2006.01)
*B60R 9/06* (2006.01)
*B62B 3/00* (2006.01)

(52) U.S. Cl.
CPC . *B60R 9/06* (2013.01); *B62B 3/00* (2013.01)

(58) Field of Classification Search
CPC .................................. B60R 9/06; B62B 3/00
USPC .......................................................... 224/521
See application file for complete search history.

(56) References Cited

U.S. PATENT DOCUMENTS

| 2,470,531 | A | 5/1949 | Suhl et al. |
|---|---|---|---|
| 4,234,284 | A | 11/1980 | Hauff |
| 4,256,320 | A | 3/1981 | Hager |
| 4,593,840 | A | 6/1986 | Chown |
| 4,744,590 | A | 5/1988 | Chesney |
| 4,802,686 | A | 2/1989 | Isreal |
| 5,368,209 | A | 11/1994 | Hill |
| 5,730,456 | A | 3/1998 | Bowers |
| 6,361,264 | B1 * | 3/2002 | Guthrie ................. B60R 9/065 224/521 |
| 6,406,051 | B1 | 6/2002 | Phillips |
| 6,471,104 | B1 * | 10/2002 | Janek ..................... B60R 9/065 220/8 |
| 6,502,730 | B2 * | 1/2003 | Johnson ................... B60R 9/06 224/402 |

(Continued)

OTHER PUBLICATIONS

International Search Report and Written Opinion for PCT/US2017/042631, dated Nov. 9, 2017, 12 pages.

*Primary Examiner* — Peter N Helvey

(57) ABSTRACT

A cargo carrier has a frame, a wheel assembly coupled to the frame, and a quick release assembly. The quick release assembly allows the user to quickly raise and lower the wheel assembly with respect to the frame, or to turn an adjusting screw to more finely raise and lower the wheel assembly. In addition, a vehicle hitch mount has an outer tube and an inner tube slidably received in the outer tube. The inner tube has a retracted position in which the inner tube is retracted with respect to the outer tube, and an extended position in which the inner tube is extended with respect to the outer tube. A locking pin can be operated by the user at one side of the cargo carrier to removably lock the hitch mount to the vehicle hitch located at an opposite side of the cargo carrier.

17 Claims, 12 Drawing Sheets

(56) References Cited

U.S. PATENT DOCUMENTS

| | | | |
|---|---|---|---|
| 6,612,615 B1 * | 9/2003 | Dimand | B60R 9/06 |
| | | | 224/531 |
| 6,725,855 B1 | 4/2004 | Brennan | |
| 6,802,441 B1 * | 10/2004 | DuRant | B60R 9/065 |
| | | | 224/513 |
| 7,188,856 B2 * | 3/2007 | Maynard | B60P 3/077 |
| | | | 280/402 |
| 7,249,771 B1 | 7/2007 | Brennan | |
| 7,641,235 B1 | 1/2010 | Anduss | |
| 7,780,394 B1 * | 8/2010 | Becker | B60P 1/4414 |
| | | | 224/509 |
| D634,260 S | 3/2011 | Farber | |
| 8,061,572 B2 | 11/2011 | Myrex | |
| 8,079,614 B1 | 12/2011 | Bui et al. | |
| 8,408,578 B2 | 4/2013 | Staples | |
| 8,720,933 B2 | 5/2014 | Raider et al. | |
| 9,216,698 B2 * | 12/2015 | Rhodes | B60R 9/065 |
| 9,850,115 B2 * | 12/2017 | Cho | B66F 13/00 |
| 2004/0025795 A1 | 2/2004 | Miale | |
| 2004/0080149 A1 | 4/2004 | Martin | |
| 2004/0173654 A1 | 9/2004 | McAlister | |
| 2006/0145461 A1 | 7/2006 | Anderson | |
| 2009/0232633 A1 | 9/2009 | Stamps et al. | |
| 2010/0155443 A1 * | 6/2010 | Lasater | B62J 7/04 |
| | | | 224/448 |
| 2011/0210152 A1 | 9/2011 | Williams | |
| 2014/0169921 A1 | 6/2014 | Carey | |
| 2015/0042071 A1 | 2/2015 | Hamm | |

\* cited by examiner

CARGO CARRIER AND QUICK HITCH MOUNT

BACKGROUND OF THE INVENTION

Field of the Invention

The present invention relates to a cargo carrier and hitch. More particularly, the present invention relates to a cargo carrier with wheels that can be raised and lowered to be attached to a vehicle hitch for transport. The invention also relates to a quick hitch mount that removably attaches a vehicle accessory to a vehicle hitch.

Background of the Related Art

Many vehicles are fitted with a hitch that attach a vehicle accessory, such as a trailer, bike rack, cooking apparatus, chair, or cargo carrier. The vehicle accessory includes a mount that is received by the vehicle hitch to attach the vehicle accessory to the vehicle hitch.

However, the vehicle accessories can be heavy, and the user must lift the accessory in order to fit it with the vehicle hitch for transport. And the mount can be awkward and difficult to attach to the vehicle hitch.

Accordingly, there is a need for a vehicle accessory that is easy to raise and lower for attachment to the vehicle hitch. In addition, there is a need for a mount that is easy to use but provide reliable attachment of the vehicle accessory to the vehicle mount.

SUMMARY OF THE INVENTION

Accordingly, it is an object of the invention to provide a cargo carrier that can be readily attached and removed from a vehicle hitch. It is a further object of the invention to provide a quick hitch mount that can be readily attached and removed from a vehicle hitch.

In accordance with these and other objects, a cargo carrier is provided that has a frame, a wheel assembly coupled to the frame, and a quick release assembly. The quick release assembly allows the user to quickly raise and lower the wheel assembly with respect to the frame, or to turn an adjusting screw to more finely raise and lower the wheel assembly. In addition, a vehicle hitch mount has an outer tube and an inner tube slidably received in the outer tube. The inner tube has a retracted position in which the inner tube is retracted with respect to the outer tube, and an extended position in which the inner tube is extended with respect to the outer tube. A locking pin can be operated by the user at one side of the cargo carrier to removably lock the hitch mount to the vehicle hitch located at an opposite side of the cargo carrier.

In a first embodiment, a carrier has a frame, a wheel assembly coupled to said frame, and a quick release assembly coupled to said frame and said wheel assembly for quickly raising and lowering said wheel assembly with respect to said frame. In a second embodiment that includes one or all of the prior embodiments, said quick release assembly comprises at least one brace coupled to said wheel assembly; a cross-support member coupled to said frame and to said at least one brace; an adjusting screw having threads, said adjusting screw positioned substantially orthogonal to said cross-support member; a gear mechanism coupled to said cross-support member and releasably coupled to said adjusting screw and movable between an uncoupled position where said gear mechanism is uncoupled from the threads of said adjusting screw and a coupled position where said gear mechanism is coupled to the threads of said adjusting screw, whereby in the uncoupled position said cross-support member rapidly moves along said adjusting screw without engaging said threads to quickly move said at least one brace to quickly raise and lower said wheel assembly, and further whereby in the coupled position said cross-support member moves along said adjusting screw to move said at least one brace to raise and lower said wheel assembly when said adjusting screw is rotated and does not move along said adjusting screw when said adjusting screw is stationary to maintain stationary said at least one brace and said wheel assembly.

In a third embodiment that includes one or all of the prior embodiments, said quick release assembly comprises a cross-support member coupled to said frame and to said wheel assembly; an adjusting screw having threads, said adjusting screw positioned substantially orthogonal to said cross-support member; a gear mechanism coupled to said cross-support member and releasably coupled to said adjusting screw and movable between an uncoupled position where said gear mechanism is uncoupled from the threads of said adjusting screw and a coupled position where said gear mechanism is coupled to the threads of said adjusting screw, whereby in the uncoupled position said cross-support member rapidly moves along said adjusting screw without engaging said threads to quickly raise and lower said wheel assembly, and further whereby in the coupled position said cross-support member moves along said adjusting screw to raise and lower said wheel assembly when said adjusting screw is rotated and does not move along said adjusting screw when said adjusting screw is stationary to maintain stationary said wheel assembly.

In a fourth embodiment that includes one or all of the prior embodiments, said gear mechanism comprises a threaded gear, a spring configured to bias said gear to couple with the thread of said adjusting screw, and a user-operated cam for selectively moving said threaded gear to couple and uncouple with the thread of said adjusting screw. In an fifth embodiment that includes one or all of the prior embodiments, said frame has a first side with a first elongated channel and a second side having a second elongated channel, wherein said cross-support member is received in said first and second elongated channels. In a sixth embodiment that includes one or all of the prior embodiments, said cross-support member moves within said first and second elongated channels as said wheel assembly is raised and lowered.

In a seventh embodiment that includes one or all of the prior embodiments, said frame has a first side and a second side opposite said first side, and further comprising a vehicle hitch mount extending from said first side to said second side.

In an eighth embodiment, a vehicle hitch mount comprising an outer tube; an inner tube slidably received in the outer tube, said inner tube having a retracted position in which said inner tube is retracted with respect to said outer tube, and an extended position in which said inner tube is extended with respect to said outer tube; at least one pin positioned at the inner tube and movable between a locked position in which the at least one pin extends outward from the inner tube, and an unlocked position in which the at least one pin does not extend outward from the inner tube; and a control rod extending though the outer tube and the inner tube and coupled with said at least one pin to selectively move said at least one pin between the locked position and unlocked position. In a ninth embodiment that includes the eighth embodiment, said vehicle hitch mount extends from a first side of said frame to a second side of said frame opposite the first side. In a tenth embodiment that includes the eighth or ninth embodiment, said at least one pin is configured to engage a vehicle hitch at the second side of said frame and further comprising a handle coupled to said control rod at the first side of said frame.

In an eleventh embodiment, the invention is a vehicle hitch mount, comprising an outer tube; an inner tube slidably received in the outer tube, said inner tube having a retracted position in which said inner tube is retracted with respect to said outer tube, and an extended position in which said inner tube is extended with respect to said outer tube; at least one pin positioned at the inner tube and movable between a locked position in which the at least one pin extends outward from the inner tube, and an unlocked position in which the at least one pin does not extend outward from the inner tube; and a control rod extending though the outer tube and the inner tube and coupled with said at least one pin to selectively move said at least one pin between the locked position and unlocked position.

In a twelfth embodiment that includes the eleventh embodiment, said extended position is extended outward from said retracted position. In a thirteenth embodiment that includes any of the eleventh or twelfth embodiments, a handle is coupled to said control rod. In a fourteenth embodiment that includes one or all of the eleventh or thirteenth embodiments, openings are provided in a side of said inner tube, and a stop member removably coupled to one of said openings to define a receiving length to a distal end of said inner tube that can be received by a vehicle hitch. In a fifteenth embodiment that includes one or all of the prior embodiments 11-14, a wedge assembly is positioned at a distal end of said inner tube, said wedge assembly having an aligned position in which said wedge assembly is aligned with said inner tube, and an offset position in which said wedge assembly is offset with respect to said inner tube. In a sixteenth embodiment that includes one or all of the prior embodiments 11-15, said wedge assembly defines a larger effective size for said inner tube when in the offset position.

In a seventeenth embodiment that includes one or all of the prior embodiments 11-16, said outer tube has at least one side and said inner tube has at least one side, further comprising an elongated guide channel in said at least one side of said outer tube and a guide member projecting outward from said at least one side of said inner tube, wherein said guide member is slidably received in said guide channel as said inner tube and said outer tube are moved between the retracted position and the extended position. In an eighteenth embodiment that includes one or all of the prior embodiments 11-17, said outer tube is elongated and has a proximal end and a distal end, and wherein said hitch mount is coupled to a carrier having a frame with a first side and a second side opposite the first side, and wherein said proximal end attaches to the first side of the frame and said distal end attaches to the second side of the frame. In a nineteenth embodiment that includes one or all of the prior embodiments, said control rod can be operated by a user at the first side of the frame and the at least one pin is located at the second side of the frame.

Each of the exemplary embodiments described above may be realized separately or in combination with other exemplary embodiments. These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
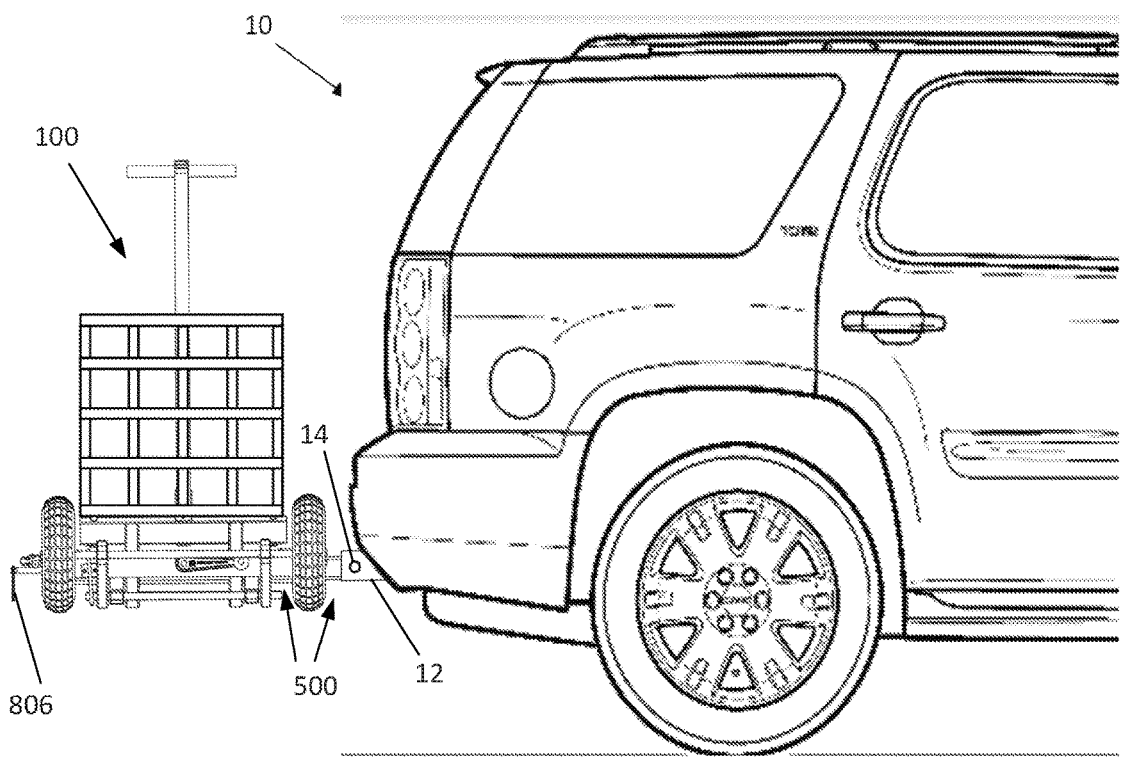
FIG. 1 is a side view of cargo carrier and vehicle hitch mount in accordance with one preferred embodiment of the invention, shown attached to a vehicle hitch of a vehicle and having a basket accessory.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIG. 1 shows a vehicle accessory assembly, here shown as a cargo carrier assembly (referred to as cargo carrier) 100, and a quick hitch mount assembly (referred to as quick hitch mount) 500. The quick hitch mount 500 extends through the cargo carrier 100 and attaches to the vehicle hitch 12 of a vehicle 10. As illustrated, the vehicle hitch 12 can be located at the rear of the vehicle 10 below the bumper, though the invention can be utilized with a hitch 12 or other mounting systems that are located at any position on the vehicle.

The cargo carrier 100 is discussed below in greater detail with respect to the non-limiting illustrative embodiments of FIGS. 2-9. The quick hitch mount 500 is discussed below in greater detail with respect to the non-limiting illustrative embodiments of FIGS. 10-13.

Cargo Carrier 100 (FIGS. 2-9)

Figure 2:
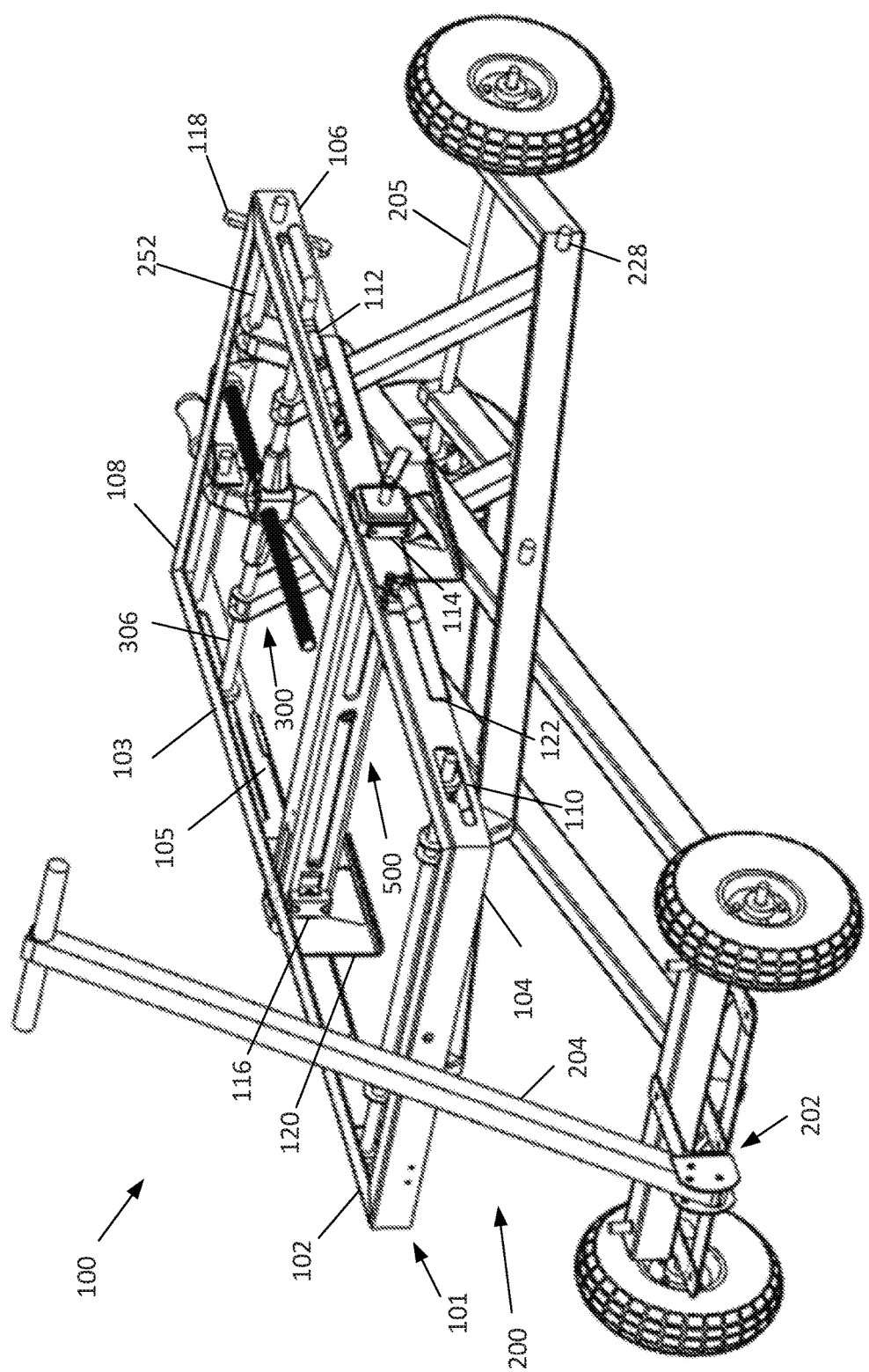
FIG. 2 is a perspective view of the cargo carrier and vehicle hitch mount.

The cargo carrier 100 of the present invention is shown in further detail in FIGS. 2-9. Referring initially to FIG. 2, the cargo carrier 100 has an upper base frame 101 and a lower wheel assembly 200. The base frame 101 includes two side frame members 102, 106, a front frame member 104, and a rear frame member 108. The frame members 102, 104, 106, 108 are elongated and can have, for example, an L-shaped cross section with a horizontal top or top portion 103 and a vertical side wall or side portion 105 extending downward from the horizontal top portion. The members 102, 104, 106, 108 are connected together to form a rectangular shape, with the side members 102, 106 being longer than the front and rear frame members 104, 108 so that the side members 102, 106 form the longitudinal sides and the front and rear frame members 104, 108 form the lateral sides of the rectangular shape. Of course, the carrier 100 can have any suitable shape, such as square or oval, and the frame members can have other shapes such as curved. A platform or base can be placed on top of the frame members 102, 104, 106, 108. For instance, a basket, wagon or other suitable device can be attached to the frame 101, such as the basket shown in FIG. 1.

The platform 101 is connected to the wheel assembly 200. In the example shown in the non-limiting embodiment of FIGS. 2-9, various openings, cutouts or holes can be formed in the side walls 105 to mate with the wheel assembly 200. A first cutout forms a first channel 110 in the side wall 105 at the front end of the right side frame member 106. The first channel 110 has a narrow portion at the front of the channel that opens up to a wider portion toward the rear of the channel 110. A second cutout forms a second channel 112 in the side wall 105 at the rear end of the right side frame member 106. The second channel 112 is elongated and has a uniform width. Both the first and second channels 110, 112 extend along the longitudinal direction of the right side frame member 106.

Figure 3:
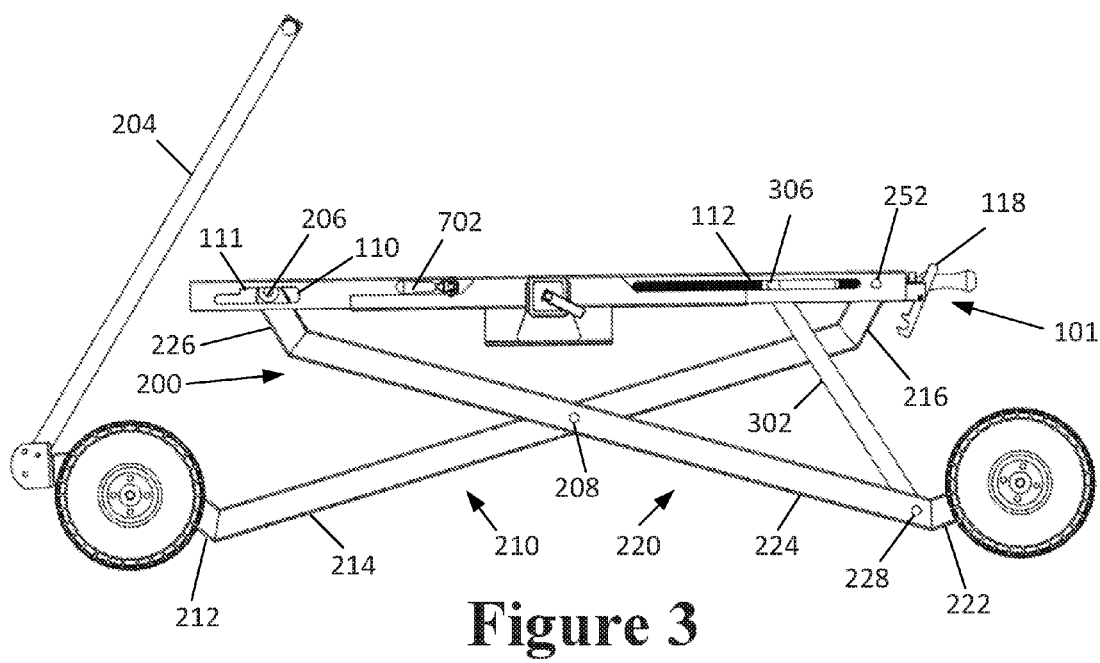
FIG. 3 is a side view of the cargo carrier with the wheel assembly extended.
Figure 4:
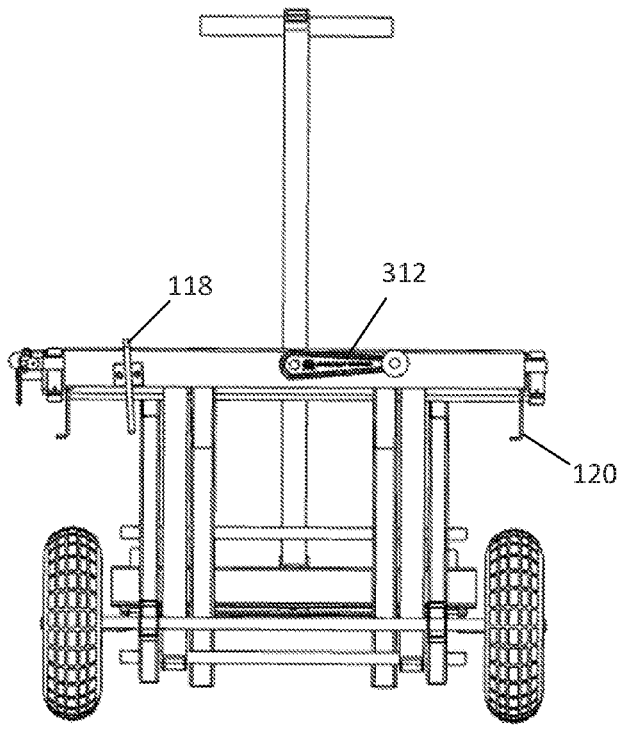
FIG. 4 is a front view of the cargo carrier.

The wheel assembly 200 is best shown in FIG. 3. The wheel assembly 200 has a first left and right leg assembly 210 and a second left and right leg assembly 220. The first and second left leg assemblies 210, 220 extend along and crisscross at the left side of the carrier 100 in a scissor fashion. And the first and second right leg assemblies 210, 220 extend along and crisscross at the right longitudinal side of the carrier 100 in a scissor fashion. A left pivot pin 208 connects the first and second left leg assemblies 210, 220 at the location where they cross, which is at about the mid-way along the length of the carrier 100. A right pivot pin 208 connects the first and second right leg assemblies 210, 220 at the location where they cross each other, which substantially aligns with the left pivot pin 208 at about the midway along the length of the carrier 100.

Each leg assembly 210, 220 has a respective wheel mating portion 212, 222, base mating portion 216, 226, and intermediate portion 214, 224 connected there between to the wheel mating portion 212, 222 and the base mating portion 216, 226. The base mating portion 216, 226 and wheel mating portion 212, 222 are straight members but bent to form an angle with respect to the intermediate portion 214, 224. It should be recognized, however, that the leg assemblies 210, 220 can be straight and need not have bent mating portions 212, 216, 222, 226. In addition, the first and second leg assemblies 210, 220 form a single unitary elongated member.

Referring to FIGS. 2, 3, 5, 7, the first leg assembly 210 couples with the two front wheels and extends along the length of the carrier to couple with the base frame 101 at the rear. More specifically, the wheel mating portion 212 connects to a front wheel drive assembly 202 at the front end of the carrier 100. The drive assembly 202 includes a cross-support member connected to the two wheels, and a handle 204 connected to the cross-support member. The wheel mating portion 212 connects to the cross-support member. The drive assembly 202 can pivot left and right, so that the front wheels (which are fixed with respect to the drive assembly 202 and cross-support member) move left and right and the user can thereby pull the handle 204 to move the carrier 100 in any direction.

Figure 5:
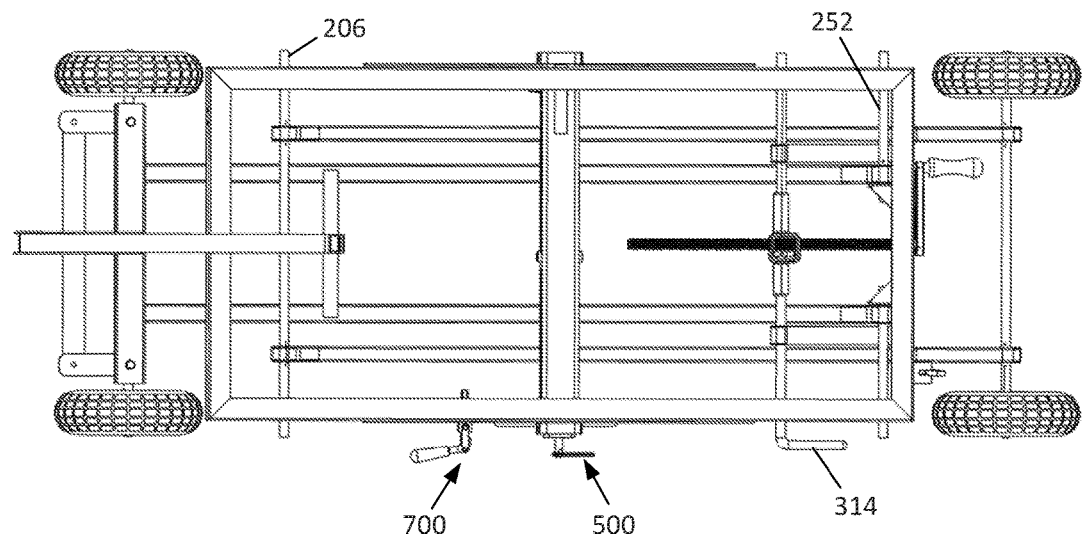
FIG. 5 is a top view of the cargo carrier.

The base mating portion 216 connects to the platform 101 at the rear of the carrier 100. More specifically as shown in FIG. 5, a support (such as a rod or the like) 252 extends transversely across at least a portion of the carrier at the rear end. The rod 252 has one end that couples with (and can extend through) the side wall 105 of the left (or right) side frame member 102. And a second end opposite the first end that is received in a bracket that is attached to the rear frame member 108. As shown, a separate support 252 can be provided at the left and right sides to connect with a respective one of the first leg assemblies 210, though it will be recognized that a single support 252 can extend the entire width of the carrier 100 to connect with both of the first leg assemblies 210. The support rotationally but fixedly connects the base mating portion 216 and the first leg assembly 210 to the rear of the carrier platform 101 at the side wall 105 of the side frame members 102, 106. Thus, the base mating portion 216 and the rear of the first leg assembly 210 can rotate up and down with respect to the platform 101, but cannot move forward/backward or left/right with respect to the platform 101.

The second leg assembly 220 couples with the base frame 101 at the front of the carrier and extends along the length of the carrier and couples with the two rear wheels. More specifically, the base mating portion 226 connects to the platform 101 at the front of the carrier 100. A support (such as a rod or the like) or guide member 206 extends transversely across the carrier at the front end and couples with (and can extend through) the side wall 105 of the left and right side frame members 102, 106. The guide member 206 is received in the first channel 110. The guide member 206 can slide forward and rearward in the first channel 110 to allow the wheel assembly 200 to be raised and lowered. Thus, the guide member 206 rotationally and slidably connects the base mating portion 226 and the second leg assembly 220 to the front of the carrier platform 101 at the side wall 105 of the side frame members 102, 106. The base mating portion 226 and the rear of the second leg assembly 220 can rotate up and down with respect to the platform 101, and can move forward/backward in the first channel 110 with respect to the platform 101, though cannot move left/right with respect to the platform 101.

The first channel 110 is longer at the bottom and shorter at the top to form a safety catch 111. The guide member 206 will enter the safety catch position if the platform 101 is lowered past a safe operating condition when not mounted to the vehicle. The safety catch 111 prevents the cart from falling all the way to the ground, and prevents a user getting caught in the wheel assembly 200. The safety catch 111 will only engage when the carrier 100 is on the ground and the quick release 300 is actuated or the adjustment handle 312 is used to lower the platform 101, since the platform 101 applies weight causing the guide member 206 to be positioned along the top shorter side of channel 110. When the carrier 100 is on the ground, the user is lowering the platform 101; whereas when the carrier 100 is attached to the hitch 12, the user is raising the wheel assembly 200. If the user wants to lower the platform all the way to the storage position when not on a vehicle, the user would need to lower the platform 101 until the safety catch 111 engages and then apply a little extra pressure using the fine adjustment handle 312, then manually raise platform to raise the bar 206 out of the safety catch 111 into the lower channel of 110. The user could then lower the platform 101 all the way. The safety catch 111 will not engage when the carrier 100 is attached to the vehicle hitch 12 and the wheel assembly 200 is being raised.

The wheel mating portion 222 connects to the rear wheels at the rear end of the carrier 100. A rear axle 205 extends between the two rear wheels, and the wheel mating portion 222 connects to the rear axle 205. The rear axle 205 remains fixed but can rotate, so the rear wheels can rotate but cannot move left/right as the front wheels.

Figure 7:
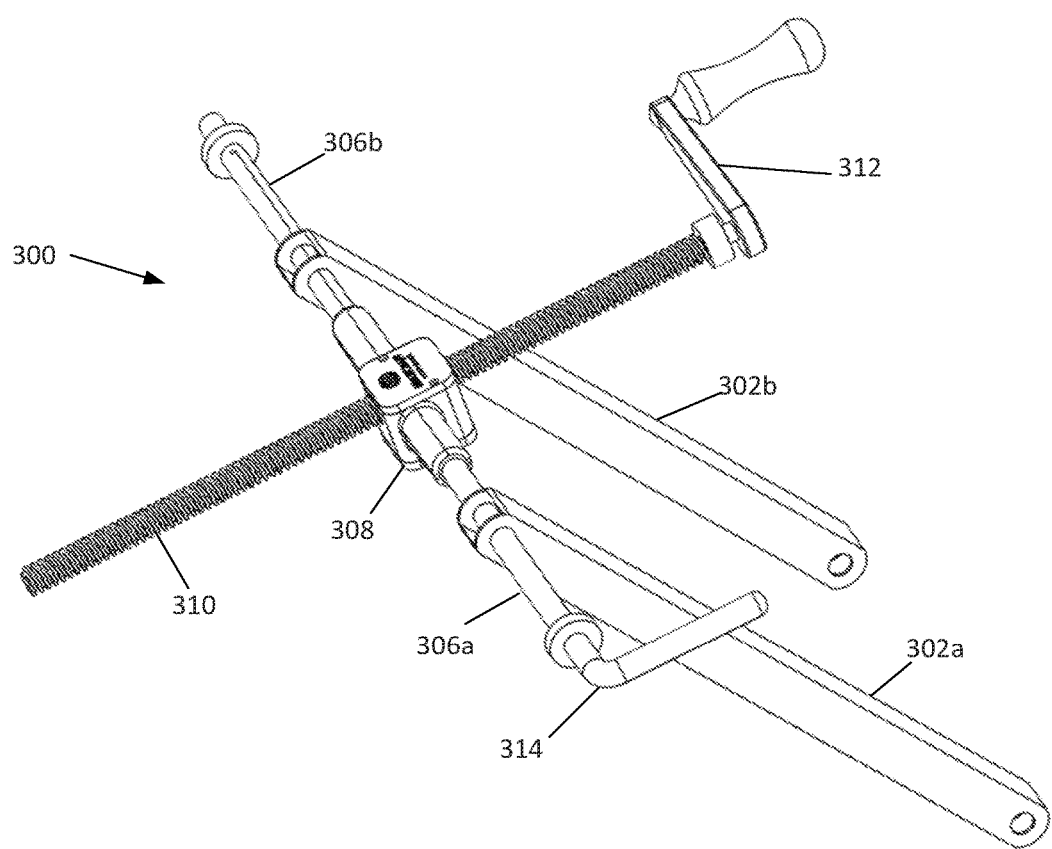
FIG. 7 is a perspective view of the quick release mechanism of the invention.

Turning to FIG. 7, the carrier 100 includes a quick release apparatus or mechanism 300. The quick release mechanism 300 includes a left and right rear brace member 302a, 302b, cross-support member 306, gearbox 308, and adjusting screw 310. As shown in FIG. 2, the quick release mechanism 300 is located toward the rear end of the carrier 100. A fine adjustment handle 312 is located at one end of the threaded adjusting screw 310. The adjusting screw 310 extends through the side portion 105 of the rear frame member 108, with the adjustment handle 312 at the outside of the rear frame member 108 and the adjusting screw 310 extending through the rear frame member 108 in a longitudinal direction. The cross-support member or guide shaft 306 is an elongated thin member, such as a rod or the like, that extends transversely across the entire width of the carrier 100 at a rear of the platform 101. Thus, the cross-support member 306 is substantially orthogonal to the adjusting screw 310. As shown in FIG. 2, the guide shaft 306 extends into and through and is slidably received by the second elongated channel 112. The guide shaft 306 can move forward and rearward within the second channel 112.

Turning back to FIG. 7, the gearbox 308 is positioned at about the middle of the guide shaft 306. The guide shaft 306 forms two halves 306a, 306b, with each half connected to the gearbox 308 and extending through the respective left and right side frames 102, 106. The gearbox 308 threadably receives the adjusting screw 310. As the screw 310 turns, the gearbox 308 moves forward and rearward on the adjusting screw 310 with respect to the platform 101, which in turn moves the guide shaft 306 forward and rearward in the second channel 112 with respect to the platform 101. The user can turn the fine adjustment handle 312 to rotate the adjusting screw 310 and move the guide shaft 306 to raise and/or lower the wheel frame assembly 200.

Figure 8A:
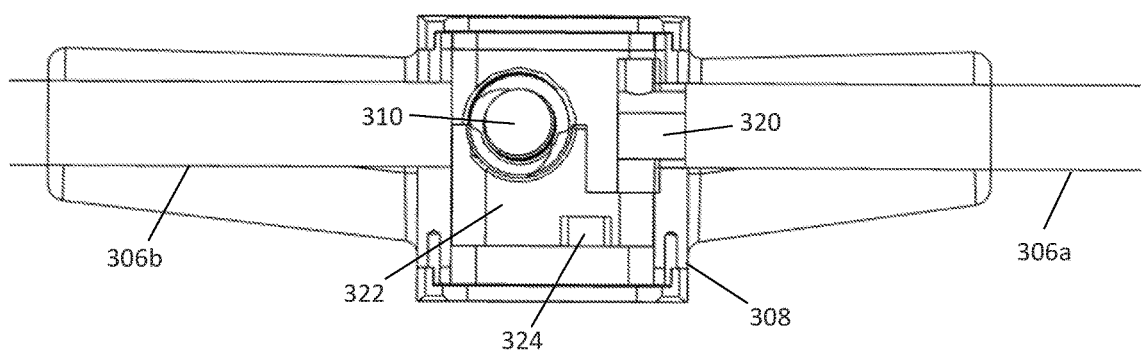
FIG. 8(a) is a side cut-away view of the quick release gear box in an engaged position.

As shown in FIGS. 7 and 8, the right guide shaft 306a has a quick release handle 314 at one end. As best shown in FIGS. 8(a), (b), the other end of that guide shaft 306a is connected to a cam 320. The cam 320 has at least one projection 326 (in the embodiment shown, two projections 326 are shown) that extends orthogonally to the guide shaft 306a. In addition, the gearbox 308 has a housing that defines an inner space. A spring loaded gear 322 is housed in the inner space of the gearbox 308. A spring 324 is located in a cavity of the gear 322. The spring pushes against one wall of the gearbox housing and forces the gear 322 into contact with the adjusting screw 310. Accordingly, the spring 324 biases the gear 322 upward (as shown in the embodiment of FIG. 8(a)) so that a curved threaded top portion of the gear 322 engages the threaded adjusting screw 310 in normal operation, so that the screw 310 can linearly move the gearbox 308 forward and rearward with respect to the platform 101.

Figure 8B:
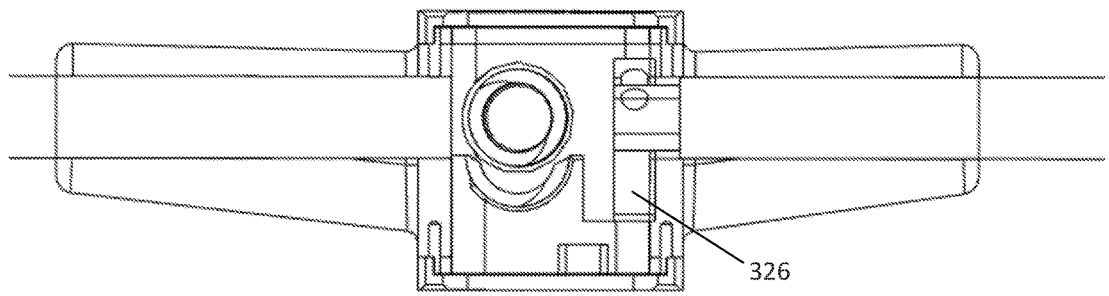
FIG. 8(b) is a side cut-away view of the quick release gear box in an disengaged position.

However, when the user rotates the handle quick release 314, the projection 326 pushes against a ledge of the gear 322, moving the gear 322 against the force of the spring 324 to disengage the gear 322 from the adjusting screw 310 (as shown in FIG. 8(b)). When the gear 322 is disengaged, the user can push the gearbox 308 along the length of the adjusting screw 310 without having to turn the adjustment handle 312. Thus, the user can turn the quick release handle 314 to disengage the gear 322 to freely and quickly raise or lower the wheel assembly 200 greater distances. When the wheel assembly 200 is at the desired position, the user turns the quick release handle 314 to re-engage the gear 322 and make any fine adjustments to the position of the wheel assembly 200.

The quick release mechanism 300 includes a rear brace member or leg lift 302. The rear brace 302 is an elongated flat or round rod. As best shown in FIGS. 2, 3 and 7, one end of the rear brace 302 connects to the intermediate portion 224 of the second leg assembly 220, where the intermediate portion 224 joins the wheel mating portion 222 toward the rear of the intermediate portion 224 and at a rear of the carrier 100. The opposite end of the rear brace 302 connects to the cross support member 306 of the quick release mechanism 300. The right rear brace member 302a connects with the right cross-support member 306a, and the left rear brace member 302b connects with the left cross-support member 306b. The rear braces 302 raise and lower the wheel assembly 200.

Referring now to FIGS. 2, 3, 5 and 6, the operation of the carrier 100 will now be discussed. In FIGS. 2, 3, the carrier 100 is shown in an open or operating position with the wheel assembly 200 in a downward position. And in FIGS. 5, 6, the carrier 100 is shown in a closed or storage position with the wheel assembly 200 in a raised position. The carrier 100 is disconnected from the vehicle hitch 12, and ready for transportation by the user pulling the handle 204. In that ready position, the wheels are located outside of the front and rear frame members 104, 108. In addition, the guide member 206 is positioned toward the rear of the first channel 110 in the wider portion of the first channel 110. The rear brace 302 is extended downward and the cross-support member 306 is positioned about midway in the elongated second channel 112.

The user can rotate the fine adjustment handle 312 to further lower the wheel assembly 200 (i.e., make the wheel assembly longer to raise the platform 101). Rotating the fine adjustment handle 312 in a first direction causes the gearbox 308 to be pulled closer to the rear frame member 108, which pulls the cross-support member 306 closer to the rear frame member 108. That in turn pushes downward on the rear braces 302 and further extends the rear braces 302 outward from the bottom of the platform 101. That causes the guide 206 to further move rearward in the first channel 110, and also causes the first leg assembly 210 to move downward by virtue of the pivot pin 208. Rotating the fine adjustment handle 312 in the opposite direction will conversely raise the wheel assembly 200 (i.e., to move the wheel assembly 200 into the closed or storage position of FIGS. 5, 6).

Instead of rotating the fine adjustment handle 312, the user can operate the quick release handle 314 to raise and lower the wheel assembly 200. For instance, the user may do that when the carrier 100 is still attached to the vehicle hitch 12, and allow the wheel assembly 200 to drop by force of gravity. The user can then rotate the quick release handle 314 back to the engaged position to make finer adjustments to the wheel assembly height, if needed. For instance, the user can drop the wheel assembly 200 by disengaging the gear 322 of the quick release, then re-engage the gear 322 and continue to raise the wheel assembly 200 to release the pressure from the vehicle hitch 12 so that the user can more easily remove the hitch mount 500 from the vehicle hitch 12 and wheel the carrier 500 away. The wheel assembly 200 can be positioned to any desired height with respect to the platform 101 by operating either the quick release gear 322 via handle 314, or the fine adjustment handle 312.

On the other hand, when the user is ready to attach the carrier 100 to the vehicle hitch 12, the user can raise or lower the wheel assembly using the fine adjustment handle 312 to align the hitch mount 500 with the vehicle hitch 12. The hitch mount 500 can then be attached to the vehicle hitch 12 and the fine adjustment handle 312 can be operated to raise the wheel assembly 200 slightly to shift the weight of the carrier 100 onto the vehicle hitch 12. The user can then operate the quick release handle 314 to disengage the gear 322 and then quickly raise the wheel assembly 200, such as by pulling upward on the rear axle 205 (FIG. 2) or the rear wheels. Once the wheel assembly 200 is in the raised position, the user can re-engage the gear 322 and rotate the fine adjustment handle 312 to make sure the wheel assembly 200 is fully raised.

Figure 6:
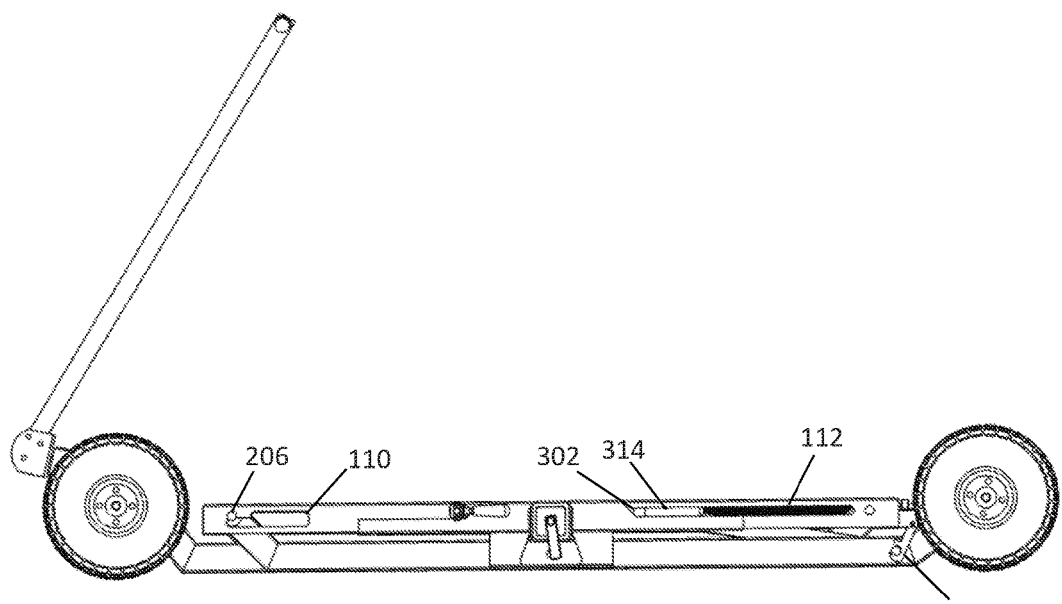
FIG. 6 is a side view of the cargo carrier with the wheel assembly retracted.

Referring to FIGS. 5, 6, the carrier 100 is shown in the storage position. The carrier 100 is preferably placed in the storage position during transport while attached to a vehicle 10. The handle 204 can be removable or can fold down or telescope inward to a storage position. In the storage position, the wheel assembly 200 is fully raised so that the wheels are aligned with the platform 101 at a position outward of the front side 101 and rear side 108, respectively (see FIG. 5). In addition, the intermediate portions 214, 224 are substantially horizontal and parallel to the side frame members 102, 106, and are positioned directly beneath the side frame members 102, 106. Because the wheel mating portions 212, 222 are angled upward, the rear axle 205 and the front drive assembly 202 are raised with respect to the intermediate portions 214, 224, as best shown in FIG. 6. Thus, the bottom of the wheels is substantially even with (or can be slightly lower or higher than) the intermediate portions 214, 224.

When the wheel assembly 200 is raised, the wheel lock 118 will automatically engage the wheel assembly 200, such by engaging part of the pin 228 that extends outward from the second leg assembly 220. For instance, the wheel lock 118 can be an elongated piece that has a notch at the bottom end and is attached to the front and/or rear ends 104, 108 of the frame by a fastener and a spring. The wheel lock 118 can be substantially vertical so that it is orthogonal to the frame members 104, 108. When the wheel assembly is raised, the pin 228 can push against the spring to move the wheel lock 118 outward. Once the pin 228 enters the notch, the wheel lock 118 will then return inward by force of the spring, to lock the pin 228 (and the wheel assembly 200) to the frame 101. Alternatively, the user can press on the top end of the wheel lock 118 to move the bottom end outward, then raise the rear axle 205 into position and release the wheel lock 118 so that the notch engages the pin 228.

Turning back to FIGS. 2, 3, the carrier 100 is shown in the operating position. The carrier 100 is preferably placed in the operating position when it is unattached from the vehicle 10 so that the user can pull the carrier 100 and any product being carried by the carrier 100. In this position, the wheel assembly 200 is in a downward position with the wheels separated by a distance from the frame 101. The wheel assembly 200 can be lowered to any desired position to create a desired distance between the frame 101 and the wheels, to thereby achieve a certain height for the carrier 100. When the wheel assembly 200 is lowered, the bottom of the wheels are lower than the wheel mating portion 212, 222 and the intermediate portion 214, 224, so that the wheel mating portion 212, 222 and intermediate portion 214, 224 do not touch the ground when the carrier 100 is being pushed or pulled by the user.

A comparison of the storage position (FIGS. 5, 6) and the operating position (FIGS. 2, 3) will further illustrate the invention. In the storage position, the guide member 206 is at the forwardmost position of the first elongated channel 110, and the cross-support member 306 is at the forwardmost position of the second elongated channel 112. The user can then operate the quick release mechanism 300 to lower the wheel assembly 200. This can be done (after the wheel lock 118 is opened to release the pin 228) by turning the fine adjustment handle 312 or unlocking the gear box 308, to pull the gear box 308 rearward (i.e., closer to the fine adjustment handle 312). As the wheel assembly 200 is lowered from the storage position to the operating position, the cross-support member 306 slides rearward along the adjusting screw 310 (FIG. 7) until the wheels reach a desired position. The cross-support member 306 also slides rearward within the second elongated channel 112.

As the cross-support member 306 moves rearward, it pushes downward on the rear of the rear brace 302. The rear brace 302 is connected to the second leg assembly 220 at the rear portion of the intermediate portion 224 by a pin 228 that extends through the intermediate portion 224 and the rear brace 302. So when the rear of the rear brace 302 is moved downward, the rear end of the second leg assembly 220 moves downward. Since the rear axle is fixed, the front end of the second leg assembly 220 moves slightly rearward, whereby the guide member 206 slides rearward in the first elongated channel 110.

In addition, when the second leg assembly 220 moves downward, the pivot pin 208 causes the first leg assembly 210 to also move downward. The first leg assembly 210 pivots about the support rods 252, which causes the first leg assembly 210 to move downward and slightly rearward (i.e., toward the rear of the carrier 100). Thus, the first leg assembly 210 moves simultaneously with the second leg assembly 220 so that the front and rear wheels are raised and lowered at the same time and the same distance. Once the wheels are at the desired position, the quick release mechanism 300 can be locked (and/or the user stops rotating the fine adjustment handle 312), which locks the wheels at that desired position. The thread pitch of the screw 310 in the gear 322 locks the gear box 308 so that the screw 310 and gear 322 do not change position even with considerable weight on the platform 101.

To raise the wheel assembly 200 from the operating position to the storage position, the user can unlock the quick release mechanism 300 and raise the wheel assembly 200 by lifting on the wheel assembly 200 (such as lifting the rear axle 205), or rotate the fine adjustment handle 312 to raise the wheel assembly 200. That causes the cross-support member 306 to move forward in the second channel 112, which raises the rear brace 302, which in turn raises the second leg assembly 220, which in turn raises the first leg assembly 210 and slides the guide member 206 forward in the first channel 110.

It is noted that FIGS. 2, 3 illustrate one operating position for the carrier 100. However, the wheels can be placed at any desired position. In a fully extended position, the guide support 206 can be at the very rear end of the first channel 110, and the cross-support 306 can be at the very rear end of the second channel 112. FIGS. 2, 3 show the wheel assembly 200 in a partly extended position, but not fully extended.

Quick Hitch Mount (FIGS. 9-13)

Figure 9:
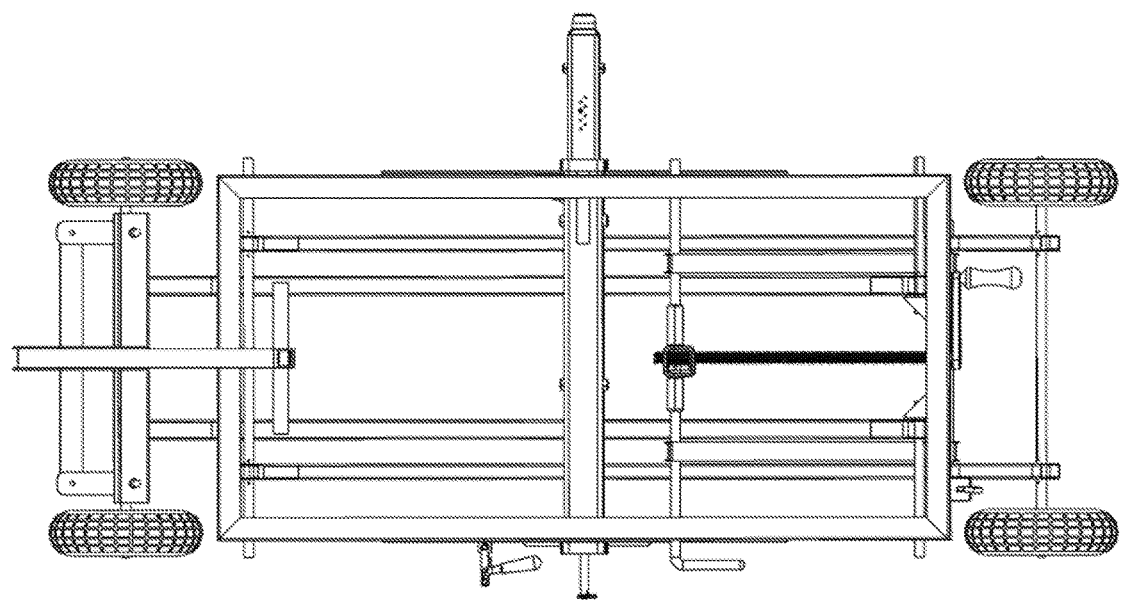
FIG. 9 is a top view of the cargo carrier with the hitch mount extended outward for engaging the vehicle hitch.
Figure 10:
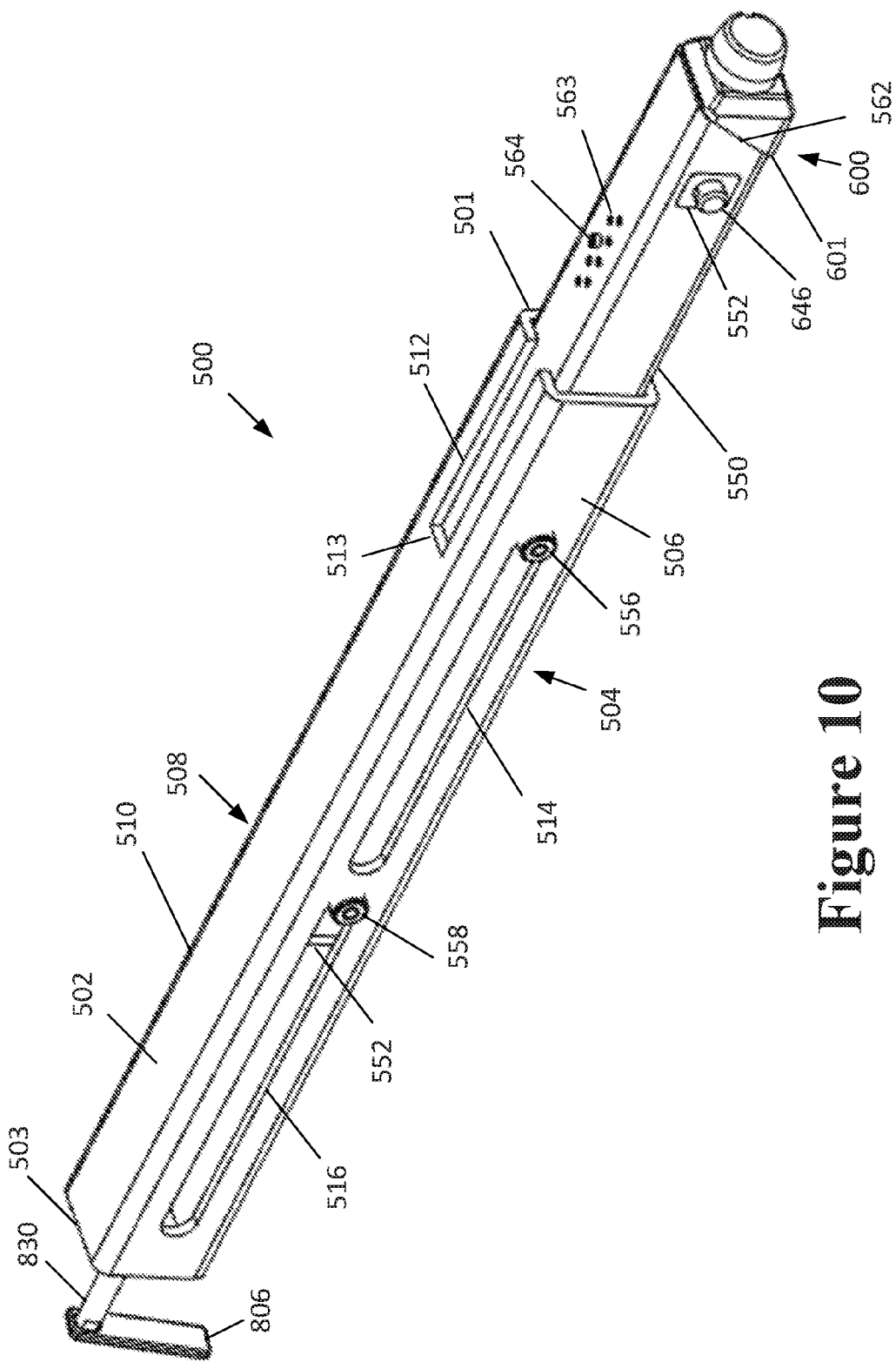
FIG. 10 is a perspective view of the quick hitch mount of the invention in an extended position.

The quick hitch mount 500 is shown in FIGS. 1-9 in combination with the cargo carrier assembly 100. However, it will be primarily be described with respect to FIGS. 9-13. The quick hitch mount 500 is best shown in FIG. 10. The mount 500 includes a tube assembly having a first outer support tube 510 and a second inner support tube 550. The outer and inner tubes 510, 550 can have the same shape, for instance as shown here, rectangular cuboids. Thus, the support tubes 510, 550 can be elongated and have a square cross-section, and support the vehicle accessory with which it is being used. The outer support tube 510 is hollow to define an inner space. The inner support tube 550 is slidably received in the inner space of the outer support tube 510. In one example of the invention, the inner tube 550 and the outer support tube 510 share the same central longitudinal axis.

The outer support tube 510 has one or more sides, for example a top 502, bottom 504, and two sides 506, 508, as well as a distal end 501 and a proximal end 503. At the distal end 501, an open-ended elongated channel 512 is provided in the top 502 of the outer support tube 510. The channel 512 is open at the distal end 501 and extends from the distal end 501 longitudinally inward. A similar channel can also optionally be provided on the bottom 504. One or more closed elongated guide channels are also provided on the support tube 510. As shown, a first elongated guide channel 514 and second elongated guide channel 516 are provided on at least one side 506 of the support tube 510. The guide channels 514, 516 extend longitudinally along the side 506 and are arranged serially. The first guide channel 514 is positioned closer to the distal end 501, and extends from about the longitudinal center of the support tube 510 toward the distal end 501. The second guide channel 516 is positioned closer to the proximal end 503 and extends from the proximal end 503 to about the center of the support tube 510.

The inner support tube 550 also has one or more sides corresponding to the outer support tube 510, for example a top, bottom, and two sides, as well as a proximal end 552 and a distal end 562. One or more openings or holes 563 are positioned longitudinally along the top of the inner tube 550 and are aligned with the channel 512 of the outer tube 510. A threaded pin or stop member 564 can be placed in any of the holes 563. The stop member 564 adjusts the length of the inner tube 550 that can be inserted into the vehicle hitch 12, so that the hitch mount 500 can be used with vehicle hitches 12 of various lengths. The channel 512 receives the pins 564 so that the inner tube 550 can be fully received within the outer tube 510. The channel 512 is sufficiently long so that the pin 564 does not contact the bottom 513 of the channel 512.

In addition, one or more guide members (for example ball bearings) can be positioned along one or more sides. For instance, a first guide member 556 is provided at about the longitudinal middle of the inner support tube 550 and is aligned with in the first closed elongated guide channel 514 of the outer support tube 510. The first guide member 556 projects outward from one side of inner support tube 550 and is slidably received in the first guide channel 514. A second guide member 558 is provided close to the proximal end 552 of the inner tube 550 and is aligned with the second closed elongated guide channel 516 of the outer tube 510. The second guide member 558 projects outward from the same side of the inner tube 550 as the first guide member 556 and is slidably received in the second guide channel 516.

The first and second guide members 556, 558 cooperate with the respective first and second guide channels 514, 516 to guide the inner tube 550 as it slides forward and rearward within the outer tube 510. The guide members and channels also prevent the inner tube 550 from coming free of the outer tube 510 and to define maximum extended and retracted total lengths of the combined outer and inner tubes 510, 550. Though two guide members and guide channels are shown on a single side of the tubes 510, 550, it will be apparent that one or more guide members and guide channels can optionally be located on one or more of the sides (e.g., the four sides of the illustrated embodiment of FIG. 10) of the support tubes 510, 550. For instance, only one guide member and guide channel can be located on the bottom of the tubes 510, 550. Or, more than one set of guide members and guide channels can be located on each side of the support tubes 510, 550.

The tubes 510, 550 have a storage or retracted position and an extended position. The retracted position is used, for instance, when the vehicle accessory to which the mount 500 is attached, is disconnected from the vehicle. The vehicle accessory can then be used without interference by the inner tube 550. The extended position is used, for instance, to attach the quick hitch mount 500 to the vehicle.

In the retracted position, the inner support tube 550 is retracted inside the outer tube 510. Here, the guide members 556, 558 are to the left side of the guide channels 514, 516 in the embodiment of FIG. 10. In the extended position, the inner support tube 550 is extended outward from the outer support tube 510. Here, the guide members 556, 558 are to the right side of the guide channels 514, 516, as shown in the embodiment of FIG. 10. It should be noted that in the retracted position, the inner support tube 550 need not be fully retracted to be completely contained within the outer support tube 510. But rather, the inner tube 550 is more inward (i.e., further received by the outer tube 510) than when it is in the extended position.

Figure 11:
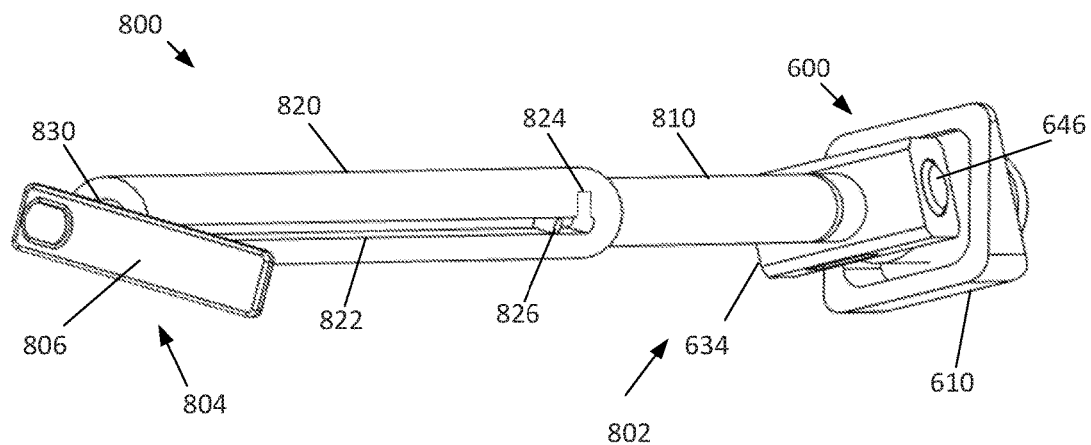
FIG. 11 is a perspective view of the handle assembly of the invention.

Turning to FIG. 11, a handle assembly 800 is provided for operating the quick hitch mount 500. The handle assembly 800 has a distal end 802 and a proximal end 804, and includes a first elongated handle tube 810 and a second elongated handle tube 820. The second handle tube 820 has a central bore that slidably receives the first handle tube 810. An elongated channel 822 extends longitudinally along the second handle tube 820. A locking slot 824 is provided at the distal end of the channel 822. A pin 826 extends outward from the surface of the first handle tube 810 at a proximal end of the first tube 810. The pin 826 is slidably received in the channel 822. The pin 826 slides within the channel 822 as the first tube 810 is slidably received and retracted from the second handle tube 820.

A handle 806 is provided at the proximal end 804 and is attached to the second handle tube 820. The user can pull on the handle 806 to extend the handle assembly 800 by withdrawing the first handle tube 810 from the second handle tube 820 until the pin 826 reaches the distal end of the channel 822. In addition, the user can push on the handle 806 to retract the handle assembly 800 by further receiving the first handle tube 810 into the central bore of the second handle tube 820. In addition, the user can turn the handle 806 to rotate the second handle tube 820 with respect to the first handle tube 810. The user can turn the handle 806 when the pin 826 is at the distal end of the channel 822, to move the pin 826 into the locking slot 824. In that locked position, the user can pull on the handle 806 to move the inner support tube 550 with respect to the outer support tube 510.

A lock and control assembly 600 is provided at the distal end 802 of the handle assembly 800, and at the distal end 562 of the inner tube 550. The lock and wedge assembly 600 has a first operation where it locks the inner tube 550 (and thereby the hitch mount 500) to the vehicle hitch, and a second operation where it wedges the inner tube 550 inside of a vehicle hitch 12 (FIG. 1), to adjust the mount 500 to fit with vehicle hitches 12 having various internal sizes (i.e., the internal bore or opening size) and also to further support the locking of the inner support tube 550 (and the hitch mount 500) to the vehicle hitch 12.

Figure 12:
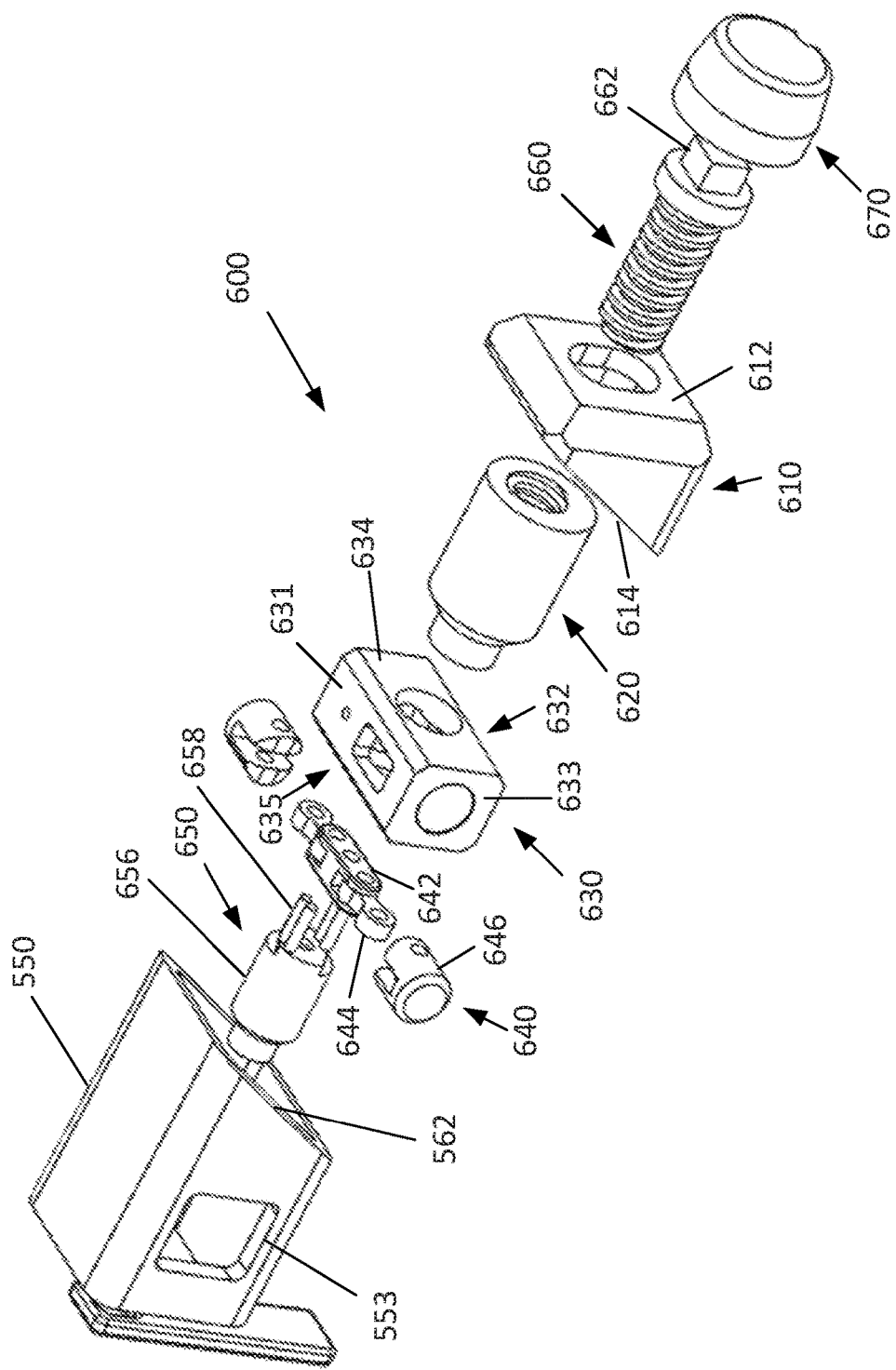
FIG. 12 is a shortened exploded perspective view of the lock and wedge assembly of the invention.

Turning to FIG. 12, details of the control and wedge assembly 600 are shown in one illustrative, non-limiting example of the invention. Here, the control and wedge assembly 600 includes a wedge 610, coupler 620, pin housing member 630, pin assembly 640, and control assembly 650.

With respect to the wedging operation of the control and wedge assembly 600, the wedge 610 is a short member that has the same general shape as the inner tube 550, but is a separate member from the inner tube 550. Thus, the wedge 610 has square or rectangular cross-section with a top, bottom, and two sides. It also has a distal end 612 and a proximal end 614. In the exemplary embodiment of FIGS. 10, 12, the proximal end 614 is angled so that the sides form a linear angle whereby the bottom is much longer than the top. The proximal end 614 is formed to align and slidably cooperate with the distal end 562 of the inner tube 550, which is also angled. In the exemplary embodiment of FIGS. 10, 12, the distal end 562 is angled so that the sides 506, 508 form a linear angle whereby the top 502 is slightly longer than the bottom 504. In this manner, the proximal end 614 of the wedge 610 can slide up and down along the distal end 562 of the inner tube 562, and particularly the two sides of the proximal end 614 slide along the two sides of the distal end 562. The wedge 610 can be formed, for example, by cutting the end of the inner tube 550 at a linear angle to form the wedge 610 as a separate member.

The user can move the wedge 610 into one of two positions with respect to the inner tube 550, namely an aligned position, and an offset position. In the aligned position, the wedge 610 is substantially aligned with the inner tube 550, whereby the top and bottom of the wedge 610 are substantially flush with the top 502 and bottom 504 of the inner tube 550. In this aligned position, the inner tube 550 and wedge 610 essentially act as a single unitary piece that can slide into and out of the vehicle hitch 12 unobstructed.

In the offset position, the wedge 610 slides downward slightly with respect to the inner tube 550. In this offset position, the top and bottom of the wedge 610 is offset from and lower than the top 502 and bottom 504 of the inner tube 550, thereby forming a lip 601 (FIG. 10) between the bottom of the wedge 610 and the bottom 504 of the inner tube 550. In this manner, the wedge 610 essentially enlarges the distal end of the inner tube 550 so that the wedge 610 pushes outward against the top interior side of the vehicle hitch 12 and the top 502 of the inner tube 550 pushes outward against the bottom interior side of the vehicle hitch 12. The wedge 610 becomes wedged within the vehicle hitch 12, thereby preventing rattling of the hitch mount 500 in the vehicle hitch 12 and further supporting the locking of the inner tube 550 (and hitch mount 500) to the vehicle hitch 12. Thus, the wedge 610 enables the mount 500 to mate with various sizes of vehicle hitches 12 and tighten or loosen the fit there between.

In addition, the lock and wedge assembly 600 includes a control assembly 650 to control locking of the inner tube 550 to the vehicle hitch 12. The control assembly 650 includes the handle assembly 800 and a control plug 656. The elongated rod assembly 800 extends through the centers of the inner support tube 550 and the outer support tube 510. A handle 806 is coupled to the proximal end of the rod assembly 800, and the control plug 656 is coupled to the distal end of the rod assembly 800. The rod assembly 800 extends the entire lengths of the inner tube 550 and the outer tube 510, so that the handle 806 projects out of the proximal end 503 of the outer tube 510 at the same time that the control plug 656 extends to or out of the distal end of the inner tube 550.

The control plug 656 mates with the pin assembly 640. The pin assembly 640 has a central housing or body 642, links 644, and pins 646. The central body 642 is rectangular or an elongated oval shape. A link 644 is coupled at each of the opposite longitudinal ends of the body 642. A pin 646 is coupled to each of the link. Thus, the link 644 has one end that is coupled to the body 642 and an opposite end that is coupled to the pin 646. The links can rotate or pivot with respect to the body 642 and with respect to the pins 646. Thus, the body 642, links 644, and pins 646 form a chain-like link, whereby the pins 646 can rotate with respect to the body 642. The control plug 656 has one or more prongs 658 that extend outward from the distal end of the plug 656. The prongs 658 engage the main body 642 of the pin assembly 640, for example one or more prongs 658 can be positioned at each of the top and bottom of the body 642 and in the embodiment of FIG. 12, two prongs are positioned at each of the top and bottom of the body 642. The body 642 is friction fit between the top and bottom prongs 658 so that the prongs 658 contact the body 642 and can rotate the body 642.

The pin assembly 640 is arranged substantially transversely with respect to the control assembly 650. The rod assembly 800 and the control assembly 650 extend longitudinally along the hitch mount 500, whereas the pin assembly 640 extends transverse to the hitch mount 500. Thus, when the user rotates the handle 806, the prongs 658 rotate and turn the main body 642 of the pin assembly 640 between a substantially vertical position and a substantially horizontal position.

The pin assembly 640 is retained in of the pin housing 630. The pin housing 630 has a top 631, bottom 632, sides 633, front distal end 634 and rear proximal end 635. The main body 642 and links 644 of the pin assembly 640 reside within the pin housing 630. The sides 633 have openings that each receive a respective one of the pins 640. The control plug 656 extends into the pin housing 630 through an opening in the rear end 635 to couple with the pin assembly 640. The pin housing 630 aligns with and can be received in windows or openings 553 in the inner tube 550. In a locked position, the main body 640 of the pin assembly 640 is horizontal, which forces the pins 646 outward through the openings in the sides 633 and out of the inner tube 550 into respective openings 14 (FIG. 1) in the vehicle hitch 12, to thereby lock the inner tube 550 and mount 500 to the vehicle hitch 12.

In an unlocked position, the main body 642 of the pin assembly 640 is in a vertical position, which retracts the pins 646 so that they do not extend out of the sides 633 of the pin housing 630. This unlocks the inner tube 550 from the mating receiving opening 14 in the vehicle hitch 12 and allows the inner tube 550 to be freely inserted and removed from the vehicle hitch 12.

The user can control the positioning of the wedge 610 between the aligned and offset positions by the wedge screw 660 and coupler 620. The screw 660 has a threaded portion and an adjustment head 662 that is wider than the threaded portion of the screw 660. The coupler 620 has one end with a threaded opening and an opposite end that is received in an opening of the pin housing 630. The threaded portion of the wedge screw 660 extends through an opening in the distal end 612 of the wedge 610 and into the threaded opening in the coupler 620. The user can rotate the screw 660 by turning the head 662, which causes the screw 660 to further enter and retract from the coupler 620. In addition, the proximal end of the coupler 620 is coupled to the plug 656, such as by a threaded bolt or the like which extends through an opening in the otherwise closed proximal end of the coupler 620 and is received by a threaded opening in the plug 656. Accordingly, when the user turns the handle 806, the plug 656 rotates the coupler 620, which causes the coupler 620 to further tighten/loosen the wedge screw 660 and expand/retract the wedge 610.

The cap 670 has a notch that is keyed to mate with the head 662 of the screw 660 (i.e., the notch is the same shape as the head 662 and slightly larger, so that the notch can snugly receive the head 662). A screw or fastener couples the cap 670 to the wedge 610 to fix the cap 670 and prevent it from moving, for example a screw can extend from the cap 670 into the proximal end 612 of the wedge 610. Thus, the cap 662 prevents the head 662 of the screw 660 from turning, so that the screw 660 does not turn when the user rotates the coupler 620 via the handle 806. Thus, turning the coupler 620 causes the coupler 620 to extend or retract from the screw 660, which in turn pulls or pushes the wedge assembly depending on direction of the turn.

When the screw 660 is tightened, the wide head of the screw 660 pushes inward against the wedge 610. That forces the angular face of the wedge 610 to slide across the mating face of the distal end 562 of the inner tube 550 to more offset the wedge 610 with respect to the tube 550, thereby causing an increase in the overall size of the tube assembly. If the screw 660 is loosened, the wedge 610 floats and the pressure from the vehicle hitch 15 can move the wedge 610 to be less offset or aligned with respect to the tube 550. The distal end of the wedge 610 is chamfered so that it can be more readily received in the vehicle hitch 15.

Once the wedge 610 is positioned, the user can replace the cap 670 on the head 662 of the screw 660 so that the position is locked in place. The position of the wedge 610 need only be set by the user one time for that particular vehicle hitch 12. The wedge 610 can be set to approximately match the size of the vehicle hitch 12, but allow the inner tube 550 to be readily inserted and removed from the hitch 12 without undue friction, but at the same time minimize bouncing and rattling of the mount 500 in the hitch 12, such as might otherwise occur if the hitch 12 is substantially larger than the inner tube 550.

Thus, the user can adjust the wedge 610 in two ways. First, by rotating the head 662 of the screw 660 to make coarse adjustments to the position of the wedge 610, user can do this when first connecting the mount 500 to a new vehicle hitch 15 to provide an approximate fit between the wedge 610 and the inner opening of the vehicle hitch 15. In addition, the user can make fine adjustments to the wedge 610 by rotating the handle 806 to rotate the plug 656 and coupler 620 with respect to the screw 660. The user would use the fine adjustment to lock the wedge assembly 600 into the vehicle hitch 15. Once the coarse adjustment is made, the user can rotate the handle 806 to expand the wedge 610 into a locked position where the wedge 610 is wedged to the vehicle hitch 15.

Thus, the user uses the coarse adjustment of the screw head 662 to initially set the wedge to approximately match the vehicle hitch 15. If the user turns the handle 806 and there is little resistance for it by the vehicle hitch 15, then the fit of the hitch/receiver may have some play in it. The user could then detach and adjust the wedge one-quarter turn or so and then re-attach it until tension is felt when the handle 806 is rotated. That would indicate that the pins 646 are fully engaged and the wedge 610 is fully engaged so that the fit should be tight and minimal or no rattle/play.

Figure 13A:
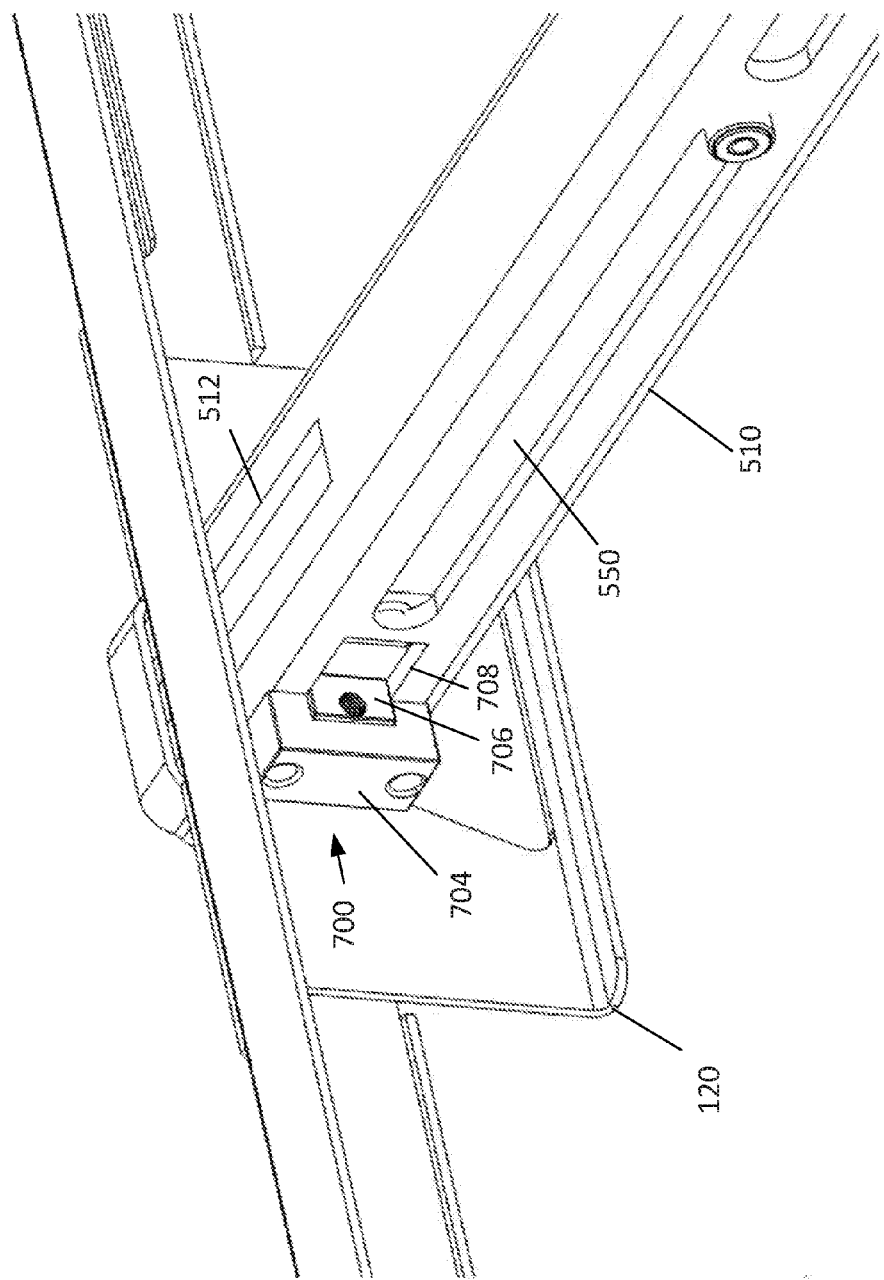
FIG. 13(a) is an enlarged perspective view of the slide lock assembly.

Turning to FIGS. 13(a), (b), (c), a slide lock assembly 700 is provided to prevent the inner support tube 550 from inadvertently sliding out of the outer support tube 510. The slide lock assembly 700 includes a handle 702 (FIG. 2), handle rod 710, wedge holder or housing 704, and wedge block 706. Referring to FIG. 13(a), a window or opening 708 is located toward the distal end 501 of the outer support tube 510. The window 708 provides access to the inner support tube 550 when the inner support tube 550 is fully received in the outer support tube 510. The wedge holder 704 is mounted to the outer support tube 510 by bolts or the like, adjacent to the window 708. A wedge block 706 is received in the window 708 adjacent the inner support tube 550.

Figure 13C:
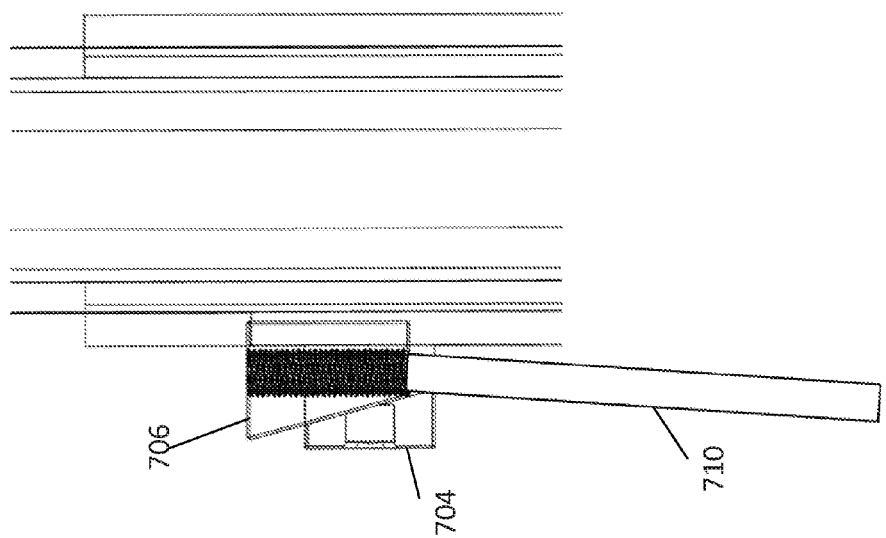
FIG. 13(c) is a top view of the slide lock assembly in the un-locked position.
Figure 13B:
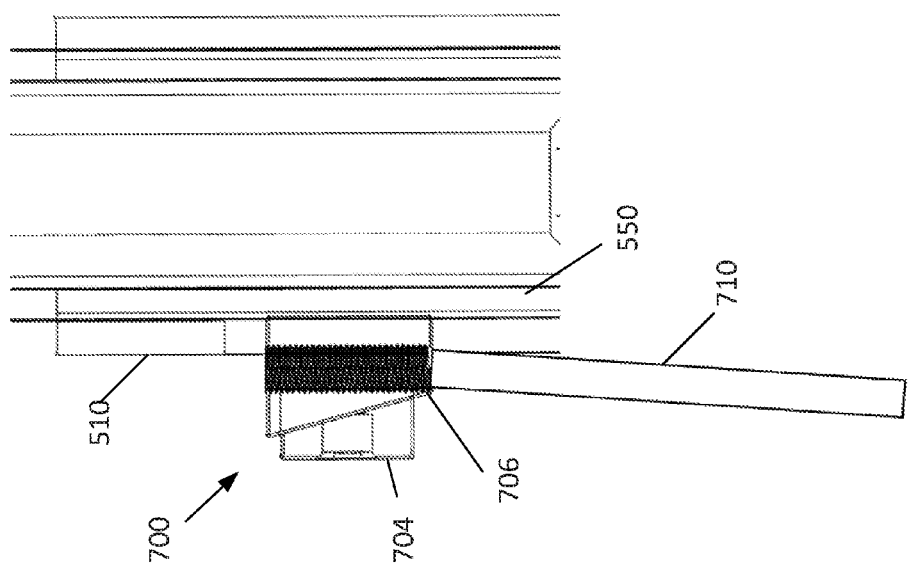
FIG. 13(b) is a top view of the slide lock assembly in the locked position.

As best shown in FIGS. 13(b), (c), the rod 710 has one end that extends through an opening in the side frame member 106 and connects to the locking handle 702 (FIG. 2), and an opposite end that is threaded to connect with a threaded opening in the wedge block 706, as shown. The wedge block 706 is received in an opening in the bottom of the wedge holder 704. The top of the wedge block 706 is angled and the bottom of the opening of the wedge holder 704 is similarly angled, so that the angled surfaces mate with one another. In FIG. 13(b), the wedge block is in a locked position whereby the wedge block is fully received in the opening of the wedge holder 704. In the locked position, the wedge block 706 pushes against the inner support tube 550. That pressure prevents the inner support tube 550 from sliding inside the outer support tube 510. The user places the slide lock assembly 700 in the locked position by pulling sideways (downward in the embodiment of FIGS. 13(b), (c)) on the handle 702 to force the wedge block 706 into the wedge holder 704.

When the user is ready to attach the carrier 100 to the vehicle hitch 12, the user can move the slide lock assembly 700 to an unlocked position, as shown in FIG. 13(c). The user pushes the handle 702 sideways (upward in the embodiment of FIGS. 13(b), (c)), which forces the wedge block 706 out of the wedge holder 704. This allows for a small gap between the wedge block 706 and the inner support tube 550, thereby releasing the inner support tube 550 so that it can freely slide with respect to the outer support tube 510. It should be noted that although the slide lock assembly 700 is shown attached to a distal end 501 of the outer support tube 510 with the handle 702 extending through the side frame member 106, it can be located at any side or bottom of the support tube assembly of the quick hitch mount 500, such as at the proximal end 503.

In operation, the mount 500 can be used to removably attach a vehicle accessory to a vehicle. The mount 500 can be integral with the vehicle accessory or a separate device that is coupled to the vehicle accessory. The mount 500 can be removably coupled to the vehicle hitch 12. As shown in FIGS. 2, 5, the tube assembly has a storage or recessed position, where the inner tube 550 is fully received within the outer tube 510 so that it does not interfere with normal operation of the vehicle accessory. In that position, the second handle tube 820 (FIG. 11) is collapsed onto the first handle tube 810 so that the second handle tube 820 is fully retracted and minimally extends from the side of the cargo carrier.

The tube assembly can be moved from the storage position (FIGS. 2, 5) to an operating or extended position (FIGS. 9, 10) where it extend out of the outer tube 510 to facilitate connecting the mount 500 to the vehicle hitch 12. When the mount 500 is ready to be coupled with the vehicle hitch 12, as shown in FIG. 9, the inner tube 550 is withdrawn outward from the outer tube 510. The user must first unlock the inner tube 550 so that it can slide with respect to the outer tube 510, by using the handle 702 to place the slide lock assembly 700 in the unlock position (FIG. 13(c)). The user can then pull outward on the handle 806 (FIG. 11) to slide the second handle tube 820 along the first handle tube 810 to thereby extend the second handle tube 820 outward. The user then turns the handle 806 slightly (perhaps a one-quarter or one-eighth turn) for the pin 826 to enter the locking slot 824. The user can then push inward on the handle 806 to force the inner support tube 550 outward and extend out of the outer tube 510 (FIGS. 9, 10).

The mount 500 can be adjusted to accommodate vehicle hitches 12 of various lengths. The first time that the mount 500 is used with a particular vehicle hitch 12, the user can insert the inner tube 550 into the vehicle hitch 12 and align the pins 646 with the mating openings 14 of the vehicle hitch 12. The user can then insert a stop pin 564 into one of the holes 563 to set the desired length of the inner tube 550 that is to be received by the hitch 12 in order for the pins 642 to align with the mating openings 14 in the vehicle hitch 12. Thus, for future uses of the mount 500 with that particular vehicle hitch 12, the user need not re-measure the location of the stop pin 564. Instead, the user can place the inner tube 550 inside the vehicle hitch 12 until the end of the vehicle hitch 12 contacts the stop pin 564. At that point, the inner tube 550 cannot be further received in the vehicle hitch 12. And, the pins 646 should be in alignment with the mating openings 14 in the vehicle hitch 12.

Thus, once the inner tube 550 is extended out from the outer tube 510 and placed in the vehicle hitch 12, the user only needs to turn the handle 806 to fully lock the mount 500 to the vehicle hitch 12 (FIG. 12). Rotating the handle 806 simultaneously extends the pins 646 outward to lock with the hitch openings 14, and also forces the wedge 610 into the locked position (i.e., further offset position whereby the wedge 610 is wedged against the vehicle hitch 12) with respect to the vehicle hitch 12. A lock mechanism can also be provided to prevent the handle 806 from inadvertently being turned, for example such as the spring lock 118 that must be actuated by the user in order to be able rotate the handle 806.

The reverse operation is followed to uncouple the mount 500 from the vehicle hitch 12 and move the hitch mount 500 from an operating position to a storage position. The user rotates the handle 806 to simultaneously retract the pins 646 inward and loosen the wedge 610 from the hitch 12. The user then pulls on the handle 806 to retract the inner support tube 550 into the outer support tube 510. The user rotates the handle 806 again to remove the pin 826 from the locking slot 824, then pushes inward on the handle 806 to slide the outer handle tube 820 onto the inner handle tube 810.

Combined Cargo Carrier 100 and Hitch Mount 500 (FIGS. 1-13)

FIGS. 1-13 shows one non-limiting example of how the cargo carrier 100 and hitch mount 500 can be utilized together. As best shown in FIG. 2, the mount 500 extends across the entire width of the carrier 100, from one side 102 to the opposite side 106. Referring to FIG. 1, one benefit of that configuration is that the user can attach the carrier 100 to (and remove the carrier 100 from) the vehicle 10 while standing on the side of the carrier 100 that is at far side of the vehicle 10. That is, in the embodiment shown in FIG. 1, the user can stand to the left of the carrier 100. The user need not stand between the carrier 100 and the vehicle 10, which can be a tight area. That also allows the carrier 100 to be placed closer to the vehicle 10 since there need not be room for the user to stand while attaching and removing the carrier 100 to the vehicle 10. That further reduces the load of the carrier 100 on the vehicle hitch 12.

As further shown in FIG. 2, the hitch mount 500 is connected to the carrier 100. A left opening 116 and a right opening 114 are located in the side wall 105 of the left and right side frames 102, 106 of the platform 101. A plate 120 is positioned about the openings 116, 114. The hitch mount 500 floats in the openings 114, 116 to provide a certain amount of freedom of movement. That enables the hitch mount 500 to be coupled with the vehicle hitch 12 without the carrier 100 and mount 500 being perfectly aligned and on level ground. By allowing the 500 to float, user can raise the carrier 100 so that the hitch mount 500 is closely aligned to vehicle receiver, which allows easier insertion into the receiver since the mount 500 has some freedom of movement. Once the inner extension tube 550 is inserted into the vehicle hitch 12, the pins are locked and the wedge 610 is wedged tightly into place as the full weight of the carrier falls upon the mount 500.

The hitch mount 500 extends from the left side 102 of the platform 101 to the right side 106 of the platform. The distal end 501 of the main tube 510 is received in the opening in the left side frame member 102 and coupled to the left side frame member 102. The distal end 501 can be flush with or protrude slightly from the left side frame member 102. And the proximal end 503 of the main tube 510 is received in the opening in the right side frame member 106 and coupled to the right side frame member 106. The proximal end 503 can be flush with or protrude slightly from the right side frame member 102, though the handle 806 preferably protrudes slightly from the side frame member 102 to be readily accessible to the user.

As shown in FIG. 2, a collar 122 is provided along the side frame member 106. The collar 122 is elongated and extends along the side frame member 106 and about the opening that receives the hitch mount 500. The collar 122 can have narrow sections to not interfere with the channels 110, 112. The collar 122 is fixedly coupled to the hitch mount 500 to prevent the hitch mount 500 from coming free from the side frame member 106. The collar 122 is slidably coupled to the outer support tube side frame 106, so that the hitch mount 500 can slide up/down on the frame member 106 to float with respect to the side frame member 106. In addition, a collar 122 can be provided at both sides of the side frame member 106, and one or more collars can be provided at the left side frame member 102 to retain the distal end of the hitch mount 500.

In operation, the user can raise the carrier 100 to the appropriate height to align the mount 500 with the vehicle hitch 12. The user then unlocks the inner tube 550 using the slide lock assembly 700 and extends the inner tube 550 using handle 806. The inner tube 550 is placed into the vehicle hitch 12 until the stop member 564 indicates that the inner tube 550 is fully seated in the hitch 12 and the pins 646 are aligned with the mating openings 14 in the hitch 12. The user can pre-set the wedge 610 one time to the size of the hitch 12, so that the size of the inner tube 550 substantially matches the size of the hitch bore. The user then rotates the handle 806 to extend the pins 646 into the hitch openings 14, thereby locking the mount 500 to the vehicle hitch 12 and locking the wedge 610 to the vehicle hitch 12. The user can then raise the carrier wheels into the storage position using the quick release, and the carrier 100 is ready for transport by the vehicle 10.

To remove the carrier 100, the reverse process is followed. The wheels are lowered to the ground by the quick release operation, the gear box 308 is locked and the fine adjustment handle 312 rotated until the carrier is raised to remove the pressure on the hitch 12. The mount handle 806 is rotated to unlock the mount 500 by withdrawing the pins from the hitch openings 14 and releasing the wedge 610, and the inner tube 550 is slidably received into the main tube 510. The inner tube 550 is then locked using the slide lock assembly 700. The carrier 100 can then be wheeled away from the vehicle 10 and any further wheel assembly height adjustments can be made.

It will be noted that the user does not need to lift the carrier 100 at any time in order to attach the carrier 100 to the vehicle 10 or remove the carrier 100 from the vehicle 10. Thus, the carrier 100 can be loaded with items to be carried by the carrier 100, and those items need not be removed during the attaching and removal process.

It is further noted that FIGS. 1-9 show the cargo carrier assembly 100 and quick hitch mount assembly 500 utilized together. When used together, those assemblies 100, 500 provide certain added benefits including having a carrier 100 that can be quickly reliably and removably attached to a vehicle 10 by the quick hitch mount 500, and at the same time can be quickly and reliably raised and lowered into a position suitable for attachment to the vehicle hitch 12.

However, it will be appreciated that the cargo carrier 100 has its own separate unique features and can be utilized with any suitable mount assembly. The quick hitch mount 500 is only one non-limiting illustrative example of a mount that can be used to attach the cargo carrier 100 to the vehicle, and the cargo carrier 100 need not be utilized with the quick hitch mount 500 of FIGS. 9-13. For instance, the cargo carrier 100 can have a conventional hitch mount integrally formed with or permanently attached to the frame of the carrier 100, and can be a non-retractable mount.

In addition, the quick hitch mount 500 has its own unique features and can be utilized with any suitable vehicle accessory that is attached to, pulled or towed by a vehicle 10 such as a trailer, bike rack, cooking apparatus, or chair. The carrier 100 is only one non-limiting illustrative example of a carrier that the mount 500 can attach to a vehicle 10, and the mount 500 need not be utilized with the cargo carrier 100 of FIGS. 1-9. In addition, the mount 500 can be any suitable length, and need not extend the entire width of the vehicle accessory.

The description uses several geometric or relational terms, such as square, rectangular, inner, outer, angled, parallel, elongated, longitudinal, transverse, and linear. In addition, the description uses several directional or positioning terms and the like, such as top, bottom, left, right, up, down, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention. Within this specification, the terms "substantially" and "about" mean plus or minus 20%, more preferably plus or minus 10%, even more preferably plus or minus 5%, most preferably plus or minus 2%.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A carrier comprising:
   a frame;
   a wheel assembly coupled to said frame;
   a quick release assembly coupled to said frame and said wheel assembly for quickly raising and lowering said wheel assembly with respect to said frame;
   an outer tube;
   an inner tube slidably received in the outer tube, said inner tube having a retracted position in which said inner tube is retracted with respect to said outer tube, and an extended position in which said inner tube is extended with respect to said outer tube;
   at least one pin positioned at the inner tube and movable between a locked position in which the at least one pin extends outward from the inner tube, and an unlocked position in which the at least one pin does not extend outward from the inner tube; and
   a control rod extending though the outer tube and the inner tube and coupled with said at least one pin to selectively move said at least one pin between the locked position and unlocked position.

2. The carrier of claim 1, wherein said quick release assembly comprises:
   at least one brace coupled to said wheel assembly;
   a cross-support member coupled to said frame and to said at least one brace;
   an adjusting screw having threads, said adjusting screw positioned substantially orthogonal to said cross-support member;
   a gear mechanism coupled to said cross-support member and releasably coupled to said adjusting screw and movable between an uncoupled position where said gear mechanism is uncoupled from the threads of said adjusting screw and a coupled position where said gear mechanism is coupled to the threads of said adjusting screw,
   whereby in the uncoupled position said cross-support member rapidly moves along said adjusting screw without engaging said threads to quickly move said at least one brace to quickly raise and lower said wheel assembly, and
   further whereby in the coupled position said cross-support member moves along said adjusting screw to move said at least one brace to raise and lower said wheel assembly when said adjusting screw is rotated and does not move along said adjusting screw when said adjusting screw is stationary to maintain stationary said at least one brace and said wheel assembly.

3. The carrier of claim 1, wherein said quick release assembly comprises:
a cross-support member coupled to said frame and to said wheel assembly;
an adjusting screw having threads, said adjusting screw positioned substantially orthogonal to said cross-support member;
a gear mechanism coupled to said cross-support member and releasably coupled to said adjusting screw and movable between an uncoupled position where said gear mechanism is uncoupled from the threads of said adjusting screw and a coupled position where said gear mechanism is coupled to the threads of said adjusting screw,
whereby in the uncoupled position said cross-support member rapidly moves along said adjusting screw without engaging said threads to quickly raise and lower said wheel assembly, and
further whereby in the coupled position said cross-support member moves along said adjusting screw to raise and lower said wheel assembly when said adjusting screw is rotated and does not move along said adjusting screw when said adjusting screw is stationary to maintain stationary said wheel assembly.

4. The carrier of claim 2, wherein said gear mechanism comprises a threaded gear, a spring configured to bias said gear to couple with the thread of said adjusting screw, and a user-operated cam for selectively moving said threaded gear to couple and uncouple with the thread of said adjusting screw.

5. The carrier of claim 1, wherein said frame has a first side with a first elongated channel and a second side having a second elongated channel, wherein said cross-support member is received in said first and second elongated channels.

6. The carrier of claim 5, wherein said cross-support member moves within said first and second elongated channels as said wheel assembly is raised and lowered.

7. The carrier of claim 1, wherein said frame has a first side and a second side opposite said first side, and further comprising a vehicle hitch mount extending from said first side to said second side.

8. The carrier of claim 1, wherein said vehicle hitch mount extends from a first side of said frame to a second side of said frame opposite the first side.

9. The carrier of claim 1, wherein said at least one pin is configured to engage a vehicle hitch at the second side of said frame and further comprising a handle coupled to said control rod at the first side of said frame.

10. A vehicle hitch mount, comprising:
an outer tube;
an inner tube slidably received in the outer tube, said inner tube having a retracted position in which said inner tube is retracted with respect to said outer tube, and an extended position in which said inner tube is extended with respect to said outer tube;
at least one pin positioned at the inner tube and movable between a locked position in which the at least one pin extends outward from the inner tube, and an unlocked position in which the at least one pin does not extend outward from the inner tube; and
a control rod extending though the outer tube and the inner tube and coupled with said at least one pin to selectively move said at least one pin between the locked position and unlocked position,
wherein said outer tube is elongated and has a proximal end and a distal end, and wherein said hitch mount is coupled to a carrier having a frame with a first side and a second side opposite the first side, and wherein said proximal end attaches to the first side of the frame and said distal end attaches to the second side of the frame.

11. The vehicle hitch mount of claim 10, wherein said extended position is extended outward from said retracted position.

12. The vehicle hitch mount of claim 10, further comprising a handle coupled to said control rod.

13. The vehicle hitch mount of claim 10, further comprising openings in a side of said inner tube, and a stop member removably coupled to one of said openings to define a receiving length to a distal end of said inner tube that can be received by a vehicle hitch.

14. A vehicle hitch mount, comprising:
an outer tube;
an inner tube slidably received in the outer tube, said inner tube having a retracted position in which said inner tube is retracted with respect to said outer tube, and an extended position in which said inner tube is extended with respect to said outer tube;
at least one pin positioned at the inner tube and movable between a locked position in which the at least one pin extends outward from the inner tube, and an unlocked position in which the at least one pin does not extend outward from the inner tube;
a control rod extending though the outer tube and the inner tube and coupled with said at least one pin to selectively move said at least one pin between the locked position and unlocked position; and
a wedge assembly positioned at a distal end of said inner tube, said wedge assembly having an aligned position in which said wedge assembly is aligned with said inner tube, and an offset position in which said wedge assembly is offset with respect to said inner tube.

15. The vehicle hitch mount of claim 14, wherein said wedge assembly defines a larger effective size for said inner tube when in the offset position.

16. A vehicle hitch mount, comprising;
an outer tube having at least one side,
an inner tube having at least one side, said inner tube slidably received in the outer tube and having a retracted position in which said inner tube is retracted with respect to said outer tube and an extended position in which said inner tube is extended with respect to said outer tube;
at least one pin positioned at the inner tube and movable between a locked position in which the at least one pin extends outward from the inner tube, and an unlocked position in which the at least one pin does not extend outward from the inner tube; and
a control rod extending though the outer tube and the inner tube and coupled with said at least one pin to selectively move said at least one pin between the locked position and unlocked position;
an elongated guide channel in said at least one side of said outer tube and a guide member projecting outward from said at least one side of said inner tube, wherein said guide member is slidably received in said guide channel as said inner tube and said outer tube are moved between the retracted position and the extended position.

17. The vehicle hitch mount of claim 10, wherein said control rod can be operated by a user at the first side of the frame and the at least one pin is located at the second side of the frame.

* * * * *